United States Patent
Wada et al.

(10) Patent No.: US 8,384,011 B2
(45) Date of Patent: Feb. 26, 2013

(54) OPTICAL DETECTION DEVICE AND ELECTRONIC EQUIPMENT FOR DETECTING AT LEAST ONE OF AN X-COORDINATE AND A Y-COORDINATE OF AN OBJECT

(75) Inventors: Hideo Wada, Osaka (JP); Akifumi Yamaguchi, Osaka (JP); Masaru Kubo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 337 days.

(21) Appl. No.: 12/872,007

(22) Filed: Aug. 31, 2010

(65) Prior Publication Data

US 2011/0141486 A1      Jun. 16, 2011

(30) Foreign Application Priority Data

Dec. 10, 2009   (JP) ................................. 2009-280631

(51) Int. Cl.
*H01J 40/14*        (2006.01)
(52) U.S. Cl. ........................ 250/221; 250/551
(58) Field of Classification Search .................. 250/221, 250/216, 551, 214 R; 356/4.01, 11, 4.03, 356/614; 396/98–121
See application file for complete search history.

(56) References Cited

U.S. PATENT DOCUMENTS 5,345,336 A * 9/1994 Aoyama et al. ............... 359/628
6,487,371 B1   11/2002 Nonaka
2006/0209015 A1 9/2006 Feldmeier et al.
2008/0240507 A1 10/2008 Niwa et al.

FOREIGN PATENT DOCUMENTS

| JP | 9-5618 A | 1/1997 |
|---|---|---|
| JP | 2000-180703 A | 6/2000 |
| JP | 2000-187499 A | 7/2000 |
| JP | 2004-78977 A | 3/2004 |
| JP | 2006-99749 A | 4/2006 |
| JP | 2006-260574 A | 9/2006 |
| JP | 2007-164814 A | 6/2007 |
| JP | 2008-250774 A | 10/2008 |
| JP | 2009-186196 A | 8/2009 |

* cited by examiner

*Primary Examiner* — Que T Le
(74) *Attorney, Agent, or Firm* — Birch, Stewart, Kolasch & Birch, LLP

(57) ABSTRACT

An optical detection device includes a light emitting element, which is an area sensor, a light emitting lens part for irradiating an object to be measured with a bundle of emission rays emitted from the light emitting element, a light receiving lens part for condensing reflected light from the object, a light receiving element for detecting reflected light from the object condensed by the light receiving lens part, and a signal processing section for processing a light-reception signal from the light receiving element. Based on the light-reception signal from the light receiving element, the signal processing section detects at least one of an x-coordinate or a y-coordinate of the object on an x-y coordinate plane from at least one of a light-spot position or a light-spot shape on the light receiving element.

8 Claims, 24 Drawing Sheets

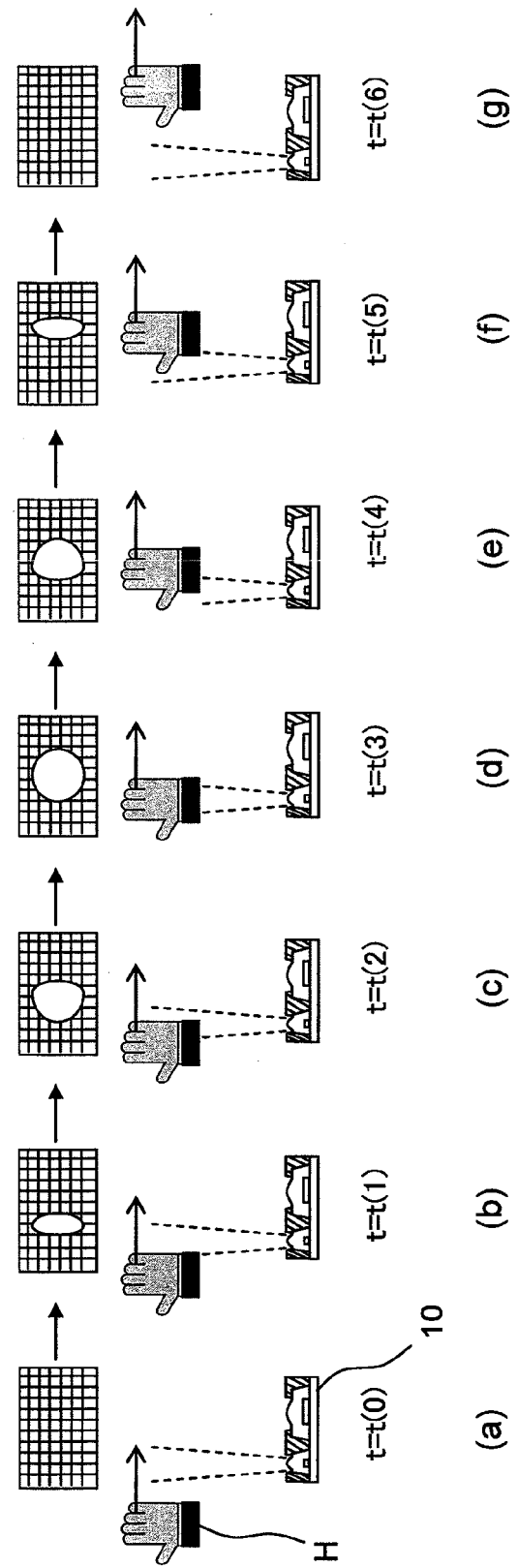

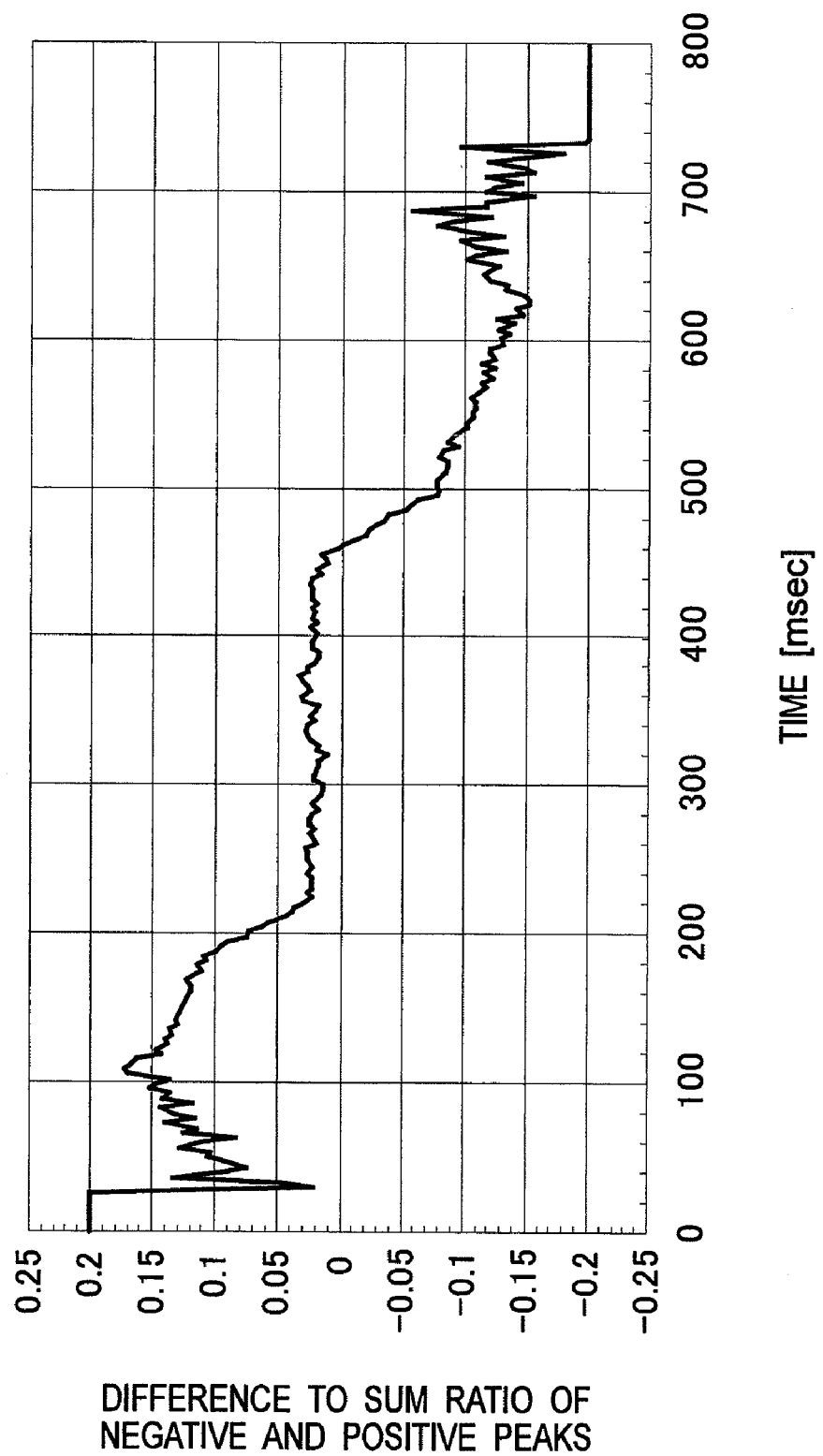

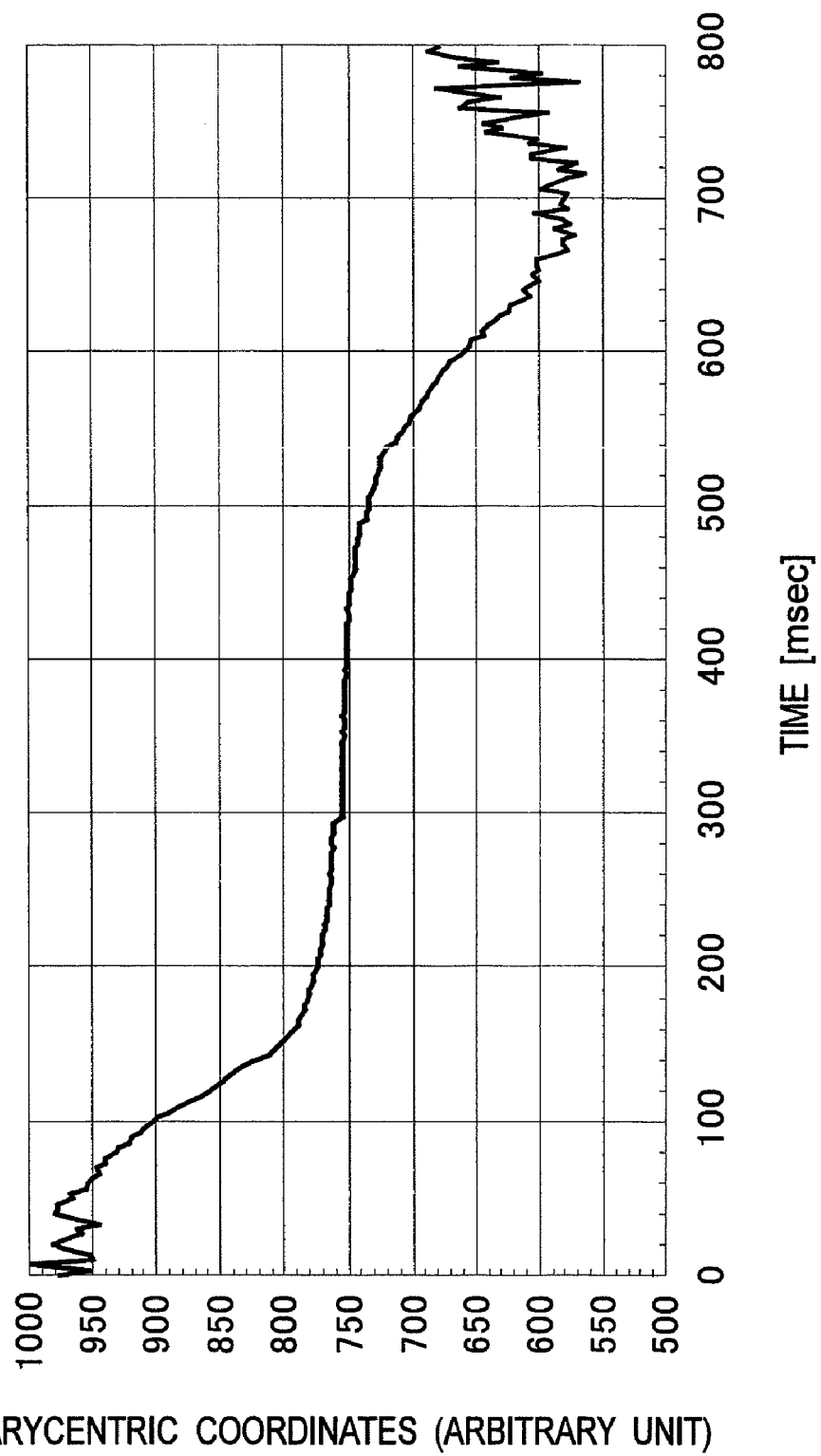

__ __ __ __

OPTICAL DETECTION DEVICE AND ELECTRONIC EQUIPMENT FOR DETECTING AT LEAST ONE OF AN X-COORDINATE AND A Y-COORDINATE OF AN OBJECT

TECHNICAL FIELD

The present invention relates to an optical detection device and electronic equipment and particularly to an optical detection device that is capable of detecting spatial position information of an object to be measured and detecting transition information of the object to be measured by measuring change with lapse of time in the spatial position information. The optical detection device of the invention is suitable for use as a control device for noncontact operation of electronic equipment, to which the present invention also relates, and particularly to electronic equipment, such as video equipment, audio equipment, and air conditioning equipment, in which the optical detection device detects positions of humans in order that operational status of the equipment may be optimized for the humans, and electronic equipment mounted with a noncontact motion controller which operates a car navigation device, mobile equipment, household electric cooking appliances or the like on basis of detection of a motion of a hand by the optical detection device.

BACKGROUND ART

As means for controlling electronic equipment such as household electric appliances, a large number of types of devices are employed, such as switches, buttons, touch pads, mice, and remote controllers. Operations in a contact method using switches, buttons, or the like have a drawback in that an operator is required to move to vicinity of the electronic equipment. The noncontact method using a remote controller or the like also has various inconveniences, drawbacks and/or the like, such as necessity of a remote control transmitter, necessity of searching for the remote control transmitter before operation, especially, in AV (Audio Visual) equipment, necessity of washing dirty hands for cooking equipment, extremely high risk in operation of a remote controller of a car navigation device by a car driver, and the like. In addition, touch pads, mice, and the like, which are instruments for operating electronic equipment, have any of such inconveniences as discussed above. To cope with such problems, techniques have been proposed that control electronic equipment on basis of detection of a motion of a human, a hand or the like in noncontact manner.

Techniques of controlling equipment on basis of a shape, a motion or the like of an imaged hand have been proposed in Patent Literature 1 (JP 2004-78977 A), Patent Literature 2 (JP 2007-164814 A), and Patent Literature 3 (JP 2008-250774 A), for instance. Patent Literature 4 (JP 2006-99749 A) has proposed a system in which a characteristic image (e.g., of a hand) is extracted from an image with distance information obtained with a wide angle by use of a distance image and in which a motion of an operator is detected on basis of the distance and the image. Patent Literature 5 (JP 2006-260574 A) has proposed an optical navigation system in which a quantity of movement is determined by comparison between a reference image picked up and the next pick-up image data.

In Patent Literatures 1 through 3 mentioned above, however, requirement of image recognition processing for recognition of an imaged subject as a hand, image signal processing for analysis of a motion of the hand, and the like leads to requirement of a sophisticated signal processing system for coping with various patterns and results in a high cost for a control device for controlling electronic equipment.

In Patent Literature 4, the recognition can be improved by provision of an image with distance information. However, a TOF (time of flight) system is employed for measuring the distance information for individual pixels. Thus the system not only requires extremely high speed signal processing for measuring round-trip time of light but makes indispensable a high output power light emitting source for ensuring obtainment of a sufficient SNR (Signal to Noise ratio:S/N ratio) for each pixel. As in Patent Literatures 1 through 3, furthermore, image signal processing is required therein and thus involves the system with a large size and a large cost for a device for controlling electronic equipment.

Patent Literature 5 involves a large cost, as is the case with Patent Literatures 1 through 3, in that image signal processing is required for extraction of the quantity of movement by comparison between the images.

CITATION LIST

Patent Literature 1: JP 2004-78977 A
Patent Literature 2: JP 2007-164814 A
Patent Literature 3: JP 2008-250774 A
Patent Literature 4: JP 2006-99749 A
Patent Literature 5: JP 2006-260574 A

SUMMARY OF INVENTION

Technical Problem

An object of the invention is to provide a small inexpensive optical detection device that is capable of easily detecting a motion of a hand or the like of a human by a simple configuration and arrangement without complicated image signal processing circuits.

Another object of the invention is to provide electronic equipment that is mounted with the optical detection device so as to be operable in noncontact manner.

Solution to Problem

In order to solve the problem, an optical detection device according to an aspect of the present invention includes:
a light emitting element;
an irradiation optical system for applying a bundle of emission rays emitted from the light emitting element to an object to be measured;
a reflected light optical system for condensing reflected light from the object to be measured;
a light receiving element for detecting reflected light from the object to be measured condensed by the reflected light optical system; and
a signal processing section for processing a light-reception signal from the light receiving element, wherein
the light receiving element is a line sensor or area sensor for detecting an intensity distribution of reflected light from the object to be measured, and
given a z-axis that is an optical axis of a bundle of emission rays emitted from the light emitting element, an x-axis that is a straight line perpendicular to the z-axis and extending along a line direction interconnecting the light emitting element and the light receiving element, a y-axis that is a straight line passing through an intersection point of the z-axis and the x-axis and perpendicular to the z-axis and the x-axis, and given an x-y coordinate plane that is a plane containing the x-axis and the y-axis, then the signal processing section detects at least one of an x-coordinate and a y-coordinate of the object to be measured on the x-y coordinate plane from at least one of a light-spot position on the light receiving element or a light-spot shape on the light receiving element based on the light-reception signal received from the light receiving element.

In this optical detection device, a bundle of emission rays emitted from the light emitting element is applied to an object to be measured by an irradiation optical system, reflected light from the object to be measured is condensed by a reflected light optical system to form a light spot on the light receiving element, and at least one of an x-coordinate or a y-coordinate of the object to be measured on the x-y coordinate plane is detected from at least one of a position or a shape of the light spot. Therefore, positional information of the object to be measured can be detected with a simple processing and without the need for any complicated image signal processing circuit. Thus, there can be realized an optical detection device which is small in size, low in price and capable of easily detecting hand or other human motions with a simple construction without requiring complicated image signal processing circuits.

In one embodiment, the signal processing section computes a differential waveform of the light-spot shape on the light receiving element based on the light-reception signal from the light receiving element, and detects at least one of the x-coordinate and the y-coordinate of the object to be measured from positive and negative peak intensities of the differential waveform.

In this embodiment, a differential waveform of a light-spot shape on the light receiving element is computed by the signal processing section based on a light-reception signal from the light receiving element, and at least one of the x-coordinate and the y-coordinate of the object to be measured is detected from the positive and negative peak intensities of the differential waveform. Thus, positional information of the object to be measured can be detected with a simple signal processing section.

In one embodiment, the light-spot position on the light receiving element is a zero-crossing position of the differential waveform of the light-spot shape on the light receiving element, and at least one of the x-coordinate and the y-coordinate of the object to be measured is detected from the zero-crossing position of the differential waveform.

In this embodiment, by the signal processing section, at least one of the x-coordinate and the y-coordinate of the object to be measured is detected from the zero-crossing position of the differential waveform of the light-spot shape representing a light-spot position on the light receiving element. Thus, positional information of the object to be measured can be detected with a simple signal processing section.

In one embodiment, the light-spot position on the light receiving element is a barycentric position of a light spot on the light receiving element, and at least one of the x-coordinate and the y-coordinate of the object to be measured is detected from the barycentric position of the light spot.

In this embodiment, by the signal processing section, at least one of the x-coordinate and the y-coordinate of the object to be measured is detected from the barycentric position of the light spot representing a light-spot position on the light receiving element. Thus, positional information of the object to be measured can be detected with the signal processing section of simple configuration.

In one embodiment, the light receiving element is an area sensor in which a plurality of pixels are arrayed in lines and rows in a grating form, and the lines of the plurality of pixels arrayed in the area sensor are parallel to the x-axis and the rows of the plurality of pixels arrayed in the area sensor are parallel to the y-axis. Also the signal processing section performs, for each of the rows parallel to the x-axis, at least one of a differential waveform computation for computing a differential waveform of a light-spot shape on pixels of the row, to detect an x-coordinate of the object to be measured from positive and negative peak intensities of the differential waveform and a barycentric position computation for detecting an x-coordinate of the object to be measured from a barycentric position of a light spot on the pixels of the line, and performs, for each of the rows parallel to the y-axis, at least one of a differential waveform computation for computing a differential waveform of a light-spot shape on pixels of the row to detect a y-coordinate of the object to be measured from positive and negative peak intensities of the differential waveform and a barycentric position computation for detecting a y-coordinate of the object to be measured from a barycentric position of a light spot on the pixels of the line.

In this embodiment, two-dimensional coordinates (xy-coordinates) of the object to be measured can be detected by performing the differential waveform computation or the barycentric position computation for each line and row of the area sensor. Thus, there can be provided an optical detection device capable of detecting two-dimensional coordinates with a simple signal processing section.

In one embodiment, the signal processing section detects a z-coordinate in the z-axis direction of the object to be measured from the light-spot position on the light receiving element by using a triangulation method.

In this embodiment, the x-coordinate in the z-axis direction of the object to be measured, i.e. a distance to the object to be measured, is detected from the spot position on the light receiving element by the triangulation method in the signal processing section. Therefore, it is possible to detect three-dimensional coordinates (xyz-coordinates) of the object to be measured with the signal processing section of simple configuration.

In one embodiment, the signal processing section detects the z-coordinate in the z-axis direction of the object to be measured when the object to be measured is irradiated with the entire bundle of emission rays emitted from the light emitting element or when the positive and negative peak intensities of the light-spot shape on the light receiving element are roughly equal to each other.

In this embodiment, by the signal processing section, detection of the z-coordinate in the z-axis direction of the object to be measured, i.e. the distance to the object to be measured, is permitted when the object to be measured is irradiated with the entire bundle of emission rays emitted from the light emitting element or when the positive and negative peak intensities of the spatial differentiation waveform of the light spot on the light receiving element are roughly equal to each other. Therefore, misdetections of distance measurement by the triangulation method can be prevented.

In one embodiment, the signal processing section detects one of a moving direction and a moving speed of the object to be measured based on a difference in at least one of the x-coordinate and the y-coordinate of the object to be measured on the x-y coordinate plane between start and end of a specified time duration.

In this embodiment, by the signal processing section, at least one of moving device and moving speed of the object to be measured is detected based on a difference in at least one of the x-coordinate and the y-coordinate of the object to be measured on the x-y coordinate plane between start and end of a specified time duration. Thus, it becomes possible to detect moving information of the object to be measured with a simple signal processing section.

Electronic equipment according to an aspect of the invention comprises:

an optical detection device arranged and configured to emit light to an object to be measured to detect positional information of the object to be measured based on reflected light from the object to be measured; and a control unit arranged and configured to control an operating state of the electronic equipment based on the positional information of the object to be measured detected by the optical detection device.

In this electronic equipment, since the position of the object to be measured such as human hand can be recognized by the optical detection device, it becomes possible to control operating state of the electronic equipment in response to motions of the hand. Thus, the electronic equipment is operable in noncontact manner.

There is also provided, according to the present invention, electronic equipment comprising:

an optical detection device arranged and configured to detect, with use of an area sensor or a line sensor, a light-spot image formed by irradiation of a bundle of emission rays emitted from a light emitting element onto an object to be measured, detect positional information of the object to be measured from the light-spot image, and compute moving information of the object to be measured from a difference in the positional information between start and end of a specified time duration; and a control unit arranged and configured to control an operating state of the electronic equipment by the moving information of the object to be measured detected by the optical detection device.

In this electronic equipment, by the optical detection device, positional information of the object to be measured is detected from a light-spot image formed by irradiation of a bundle of emission rays emitted from the light emitting element onto the object to be measured, and moreover moving information of the object to be measured is calculated from a difference of the positional information between start and end of a specified time duration. Then, by the moving information of the object to be measured obtained by the optical detection device, the operating state of the electronic equipment is controlled by the control unit. Thus, the optical detection device detects motions of the hand or the like, so that the operating state of the electronic equipment can be adjusted in noncontact manner without touching the electronic equipment, making it possible to control the electronic equipment even when the hand is dirtied.

Electronic equipment according to another aspect of the present invention comprises:

an optical detection device arranged and configured to emit light to an object to be measured to detect at least one of positional information and moving information of the object to be measured based on reflected light from the object to be measured; and a control unit arranged and configured to control an operating state of the electronic equipment based on the at least one of the positional information and the moving information of the object to be measured detected by the optical detection device, wherein the control unit is permitted to control the operating state of the electronic equipment when it is discriminated, based on at least one of the positional information and the moving information of the object to be measured detected by the optical detection device, that a predetermined state of the object to be measured has continued for a certain time period, and when the control unit is permitted to control the operating state of the electronic equipment, the control unit controls the operating state of the electronic equipment based on at least one of the positional information and the moving information of the object to be measured detected by the optical detection device.

In this electronic equipment, when it is discriminated, based on at least one of the positional information and the moving information of the object to be measured detected by the optical detection device, that a predetermined state of the object to be measured has continued for a certain time period, the control unit is permitted to control the operating state of the electronic equipment. Then, when the control of the operating state of the electronic equipment is permitted, the control unit controls the operating state of the electronic equipment based on at least one of the positional information and the moving information of the object to be measured detected by the optical detection device. Thus, since the function of controlling the operating state of the electronic equipment is permitted when it is discriminated that a preset state of the object to be measured has continued for a certain time period, mis-operations can be prevented because the operating state of the electronic equipment is never changed even when the object to be measured has unintentionally entered into the detection area of the optical detection device.

Also, electronic equipment according to another aspect of the present invention comprises:

an optical detection device arranged and configured to emit light to an object to be measured to detect at least one of positional information and moving information of the object to be measured based on reflected light from the object to be measured; and a control unit arranged and configured to control an operating state of the electronic equipment based on the at least one of the positional information and the moving information of the object to be measured detected by the optical detection device, wherein after setting an operating state of the electronic equipment based on at least one of the positional information and the moving information of the object to be measured detected by the optical detection device, and when it is discriminated, based on at least one of the positional information and the moving information of the object to be measured detected by the optical detection device, that a predetermined state of the object to be measured has continued for a certain time period, the control unit executes control for the set operating state of the electronic equipment.

In this electronic equipment, a setting for the operating state of the electronic equipment is made by the control unit based on at least one of the positional information and the moving information of the object to be measured detected by the optical detection device, and thereafter based on the at least one of the positional information and the moving information of the object to be measured detected by the optical detection device, the control unit executes the control for the set operating state of the electronic equipment when it is discriminated that a predetermined state of the object to be measured has continued for a certain time period. Thus, mis-operations can be prevented because the operating state of the electronic equipment is never changed even when the object to be measured has unintentionally entered into the detection area of the optical detection device. Moreover, when the operator redoes operation or performs continued operation, there is no need for setting the equipment control mode active for each operation, so that the equipment can be made more convenient for use.

There is also provided, according to the present invention, electronic equipment comprising:

an optical detection device arranged and configured to emit light to an object to be measured to detect positional information of the object to be measured based on reflected light from the object to be measured; and a control unit arranged and configured to control an operating state of the electronic equipment based on the positional information of the object to be measured detected by the optical detection device, wherein given a z-axis that is a light-emission optical axis or a light-reception optical axis, an x-axis that is a straight line perpendicular to the z-axis and extending along a plane containing the light-emission optical axis and the light-reception optical axis, a y-axis that is a straight line passing through an intersection point of the z-axis and the x-axis and perpendicular to the z-axis and the x-axis, and given an x-y coordinate plane that is a plane containing the x-axis and the y-axis, then the optical detection device detects an x-coordinate and a y-coordinate of the object to be measured on the x-y coordinate plane as the positional information, and wherein the control unit successively feeds menus of a plurality of operating states to be selected for controlling the electronic equipment when it is discriminated, based on the x-coordinate and the y-coordinate of the object to be measured detected by the optical detection device, that the object to be measured has moved along the x-y coordinate plane, and the control unit executes control for the operating state selected from the menus when it is discriminated, based on the z-coordinate of the object to be measured detected by the optical detection device, that a distance to the object to be measured has changed under a predetermined condition.

In this electronic equipment, with the object to be measured moved along the x-y coordinate plane, based on the x-coordinate and the y-coordinate of the object to be measured detected by the optical detection device, menus as to a plurality of operating states for controlling the electronic equipment are successively fed by the control unit for selection of a desired function, and when it is discriminated, based on the z-coordinate of the object to be measured detected by the optical detection device, that the distance to the object to be measured has changed to a predetermined condition, the control unit executes control for the operating state selected from the menus. Thus, it becomes possible to effectively select and execute a desired function in noncontact manner.

Advantageous Effects of Invention

As is apparent from the above, according to the present invention, it is possible to achieve a small inexpensive optical detection device that is capable of easily detecting a motion of a hand or the like of a human by a simple configuration and arrangement without complicated image signal processing circuits.

Also, according to the present invention, it is possible to achieve electronic equipment that is mounted with the optical detection device so as to be operable in noncontact manner.

BRIEF DESCRIPTION OF DRAWINGS

The present invention will become more fully understood from the detailed description given hereinbelow and the accompanying drawings which are given by way of illustration only, and thus are not intended to limit the present invention, and wherein:

FIG. 3 is a view for explaining states of a light spot detected by the optical detection device;

FIG. 6 is a chart showing time dependence of a difference to sum ratio of positive and negative peaks of FIG. 5B;

FIG. 7 is a positional information characteristic chart using a spot position of the optical detection device;

DESCRIPTION OF EMBODIMENTS

Figure 1:
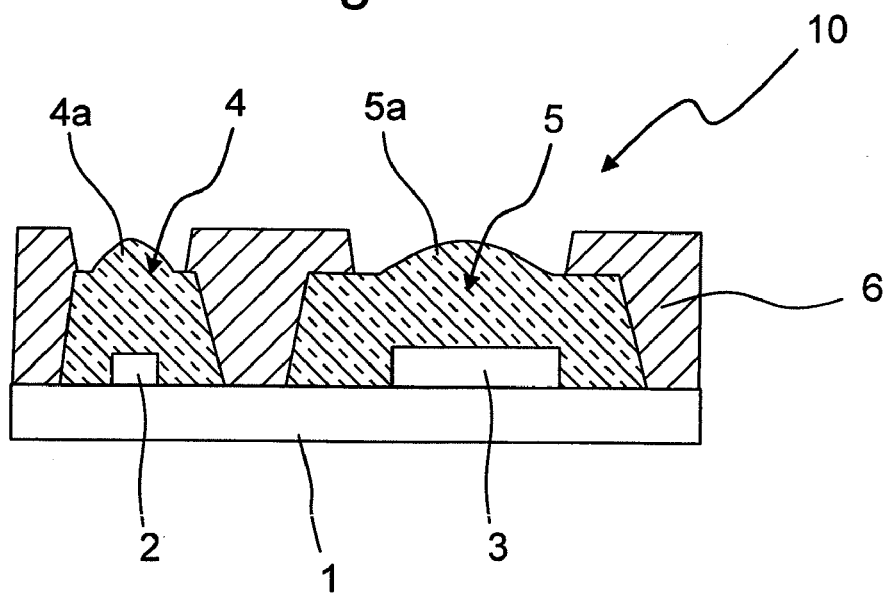
FIG. 1 is a sectional view showing a configuration of an optical detection device according to a first embodiment of the present invention.

The invention is intended for provision of a control device that is not capable of performing various modes of noncontact control for equipment but performs comparatively simple control, and the invention provides an inexpensive small optical detection device that is capable of controlling electronic equipment by a simple configuration without requiring complicated image signal processing circuits for image recognition and/or the like.

Hereinbelow, the optical detection device and electronic equipment having the same in accordance with the invention will be described in detail with reference to embodiments shown in the drawings.

First Embodiment

FIG. 1 is a sectional view showing a configuration of an optical detection device according to a first embodiment of the invention. As shown in FIG. 1, the optical detection device 10 of the first embodiment has a light emitting element 2 and a light receiving element 3 that are installed at a specified distance from each other on a substrate 1, a light-pervious resin part 4 that is molded out of light-pervious resin so as to cover the light emitting element 2, and a light-pervious resin part 5 that is molded out of light-pervious resin so as to cover the light receiving element 3. Formed in the light-pervious resin part 4 is a light emitting lens part 4a as an example of an irradiation optical system through which a bundle of emission rays is emitted from the light emitting element 2. Also, formed in the light-pervious resin part 5 is a light receiving lens part 5a as an example of a reflected light optical system on which reflected light is incident. The optical detection device 10 has a shading resin part 6 that is molded out of shading resin so as to cover outside of the light-pervious resin parts 4 and 5 except the light emitting lens part 4a and the light receiving lens part 5a.

Figure 2:
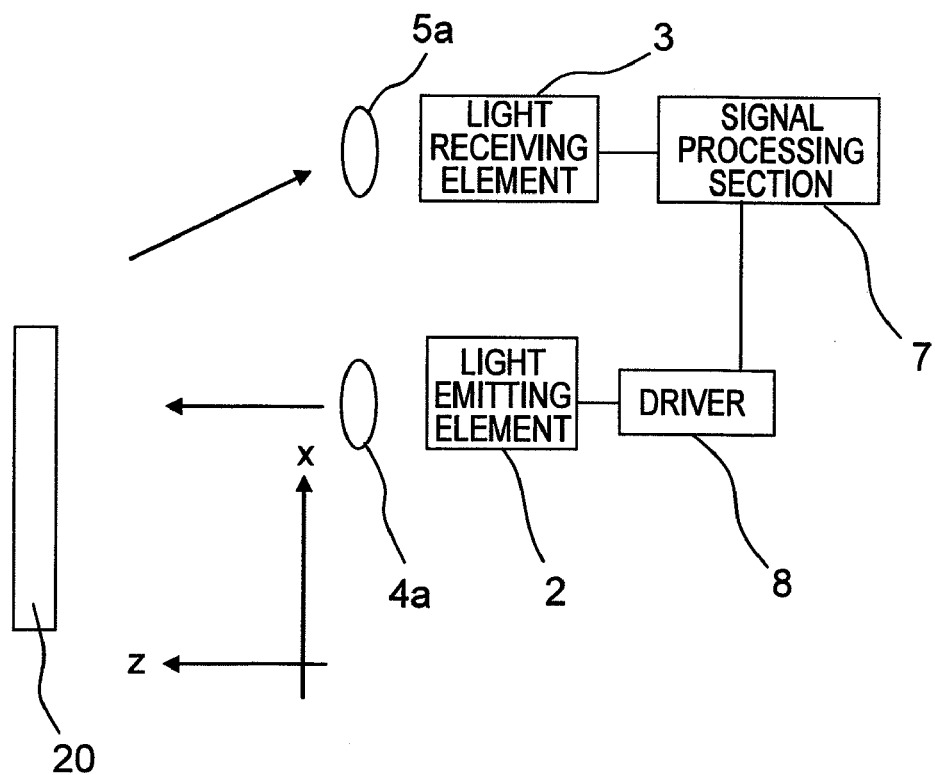
FIG. 2 is a schematic view showing a schematic configuration of the optical detection device.

FIG. 2 is a schematic diagram showing a schematic configuration of the optical detection device 10. In the optical detection device 10, an LED (Light Emitting Diode) is used as the light emitting element 2 and an image sensor is used as the light receiving element 3. A light emission signal is inputted from a signal processing unit 7 into a driver 8, so that the LED as the light emitting element 2 emits light under specified pulse conditions. The light emitted from the light emitting element 2 is focused by the light emitting lens part 4a and is projected onto an object 20 to be measured. The light reflected by the object 20 to be measured is condensed by the light receiving lens part 5a so as to form a light spot on the image sensor as the light receiving element 3. The light receiving element 3 detects an intensity distribution of the light spot, and a light reception signal representing the intensity distribution of the light spot is inputted from the light receiving element 3 into the signal processing unit 7.

FIGS. 1 and 2 show the schematic configuration of the optical detection device of the invention. The light emitting lens part and the light receiving lens part do not have to be formed in the light-pervious resin parts of FIG. 1, for instance, but may be attached to the substrate by lens holders or the like, for instance, and have only to be such parts as can achieve the schematic configuration shown in FIG. 2. Though the image sensor (area sensor) capable of detecting two-dimensional distribution is used as the light receiving element 3 in FIG. 2, a line sensor in which pixels are arranged only along a one-dimensional direction may be substituted therefor.

Subsequently, processing of the light reception signal, inputted into the signal processing unit 7, that represents the intensity distribution of the light spot will be described in detail.

(First Method of Position Computation)

FIGS. 3(a) through 3(g) show status of an object H to be measured and a light spot at various times in crossing a bundle of emission rays of the object H (a human hand in the embodiment) to be measured in a position at a distance from the bundle of emission rays. Upper parts of FIGS. 3(a) through 3(g) show an area on the light receiving element (image sensor) 3 to which the light spot is projected, and lower parts of FIGS. 3(a) through 3(g) show positional relations between the bundle of emission rays of the optical detection device 10 and the object H to be measured.

FIG. 3 represents lapse of time from t(0) in initial status through t(1), t(2), . . . in a rightward direction. At the time t(0) shown in FIG. 3(a), the object H to be measured that is sufficiently distant from the bundle of emission rays results in absence of reflected light and no projection of the light spot onto the light receiving element 3 (image sensor).

At the time t(1) shown in FIG. 3(b), an end portion of the object H to be measured is irradiated with the bundle of emission rays, and thus a light spot image formed of only a portion (left end portion in the drawing) of the bundle of emission rays is detected on the light receiving element 3 (image sensor).

At the time t(2) shown in FIG. 3(c), a ratio of an irradiated area of the object H to be measured is increased so that a light spot image biased leftward in the drawing is detected on the light receiving element 3 (image sensor). At the time t(3) shown in FIG. 3(d), the object H to be measured is irradiated with the whole bundle of emission rays, and a perfect-circle-like light spot image including the whole bundle of emission rays is detected on the light receiving element 3 (image sensor). After that, the light spot image is gradually biased rightward in the drawing with lapse of time as opposed to entrance of the object H to be measured in the bundle of emission rays. Once the object H to be measured sufficiently gets away from the bundle of emission rays at the time t(6) shown in FIG. 3(g) in course of time, no light spot image is detected on the light receiving element 3 (image sensor).

Thus the light spots detected on the light receiving element 3 (image sensor) differ in shape according to positions of the object H to be measured. Accordingly, a position of the object H to be measured can be detected by the signal processing unit 7 on basis of, for instance, a shape of the spot on or above a threshold level. This makes it possible to detect a position coordinate in a direction of arrangement of the light emitting element 2 and the light receiving element 3 on a plane perpendicular to an optical axis of the light emitted from the light emitting element 2, e.g., to detect an x-coordinate with respect to a z-axis that is the optical axis of the light emitted from the light emitting element 2 and an x-axis that is a straight line being orthogonal to the z-axis and linking the light emitting element 2 and the light receiving element 3.

(Second Method of Position Computation)

Figure 4A:
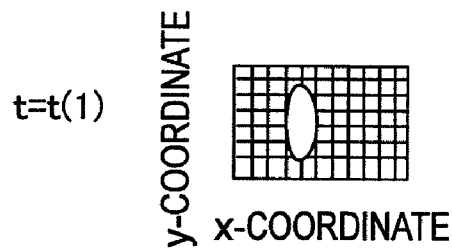
FIGS. 4A-4I are charts for explaining signal processing methods in the optical detection device.
Figure 4B:
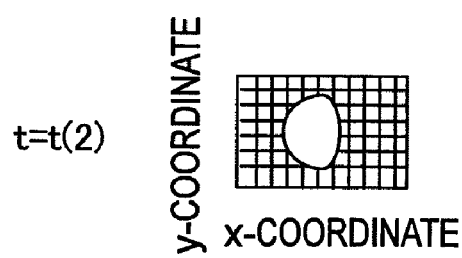
Figure 4C:
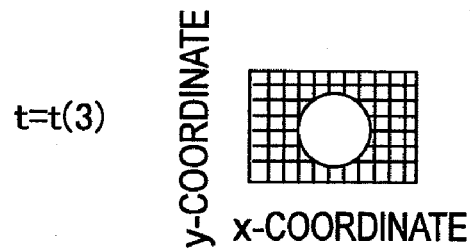
Figure 4D:
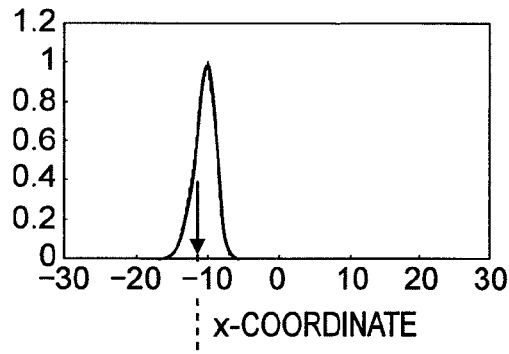
Figure 4E:
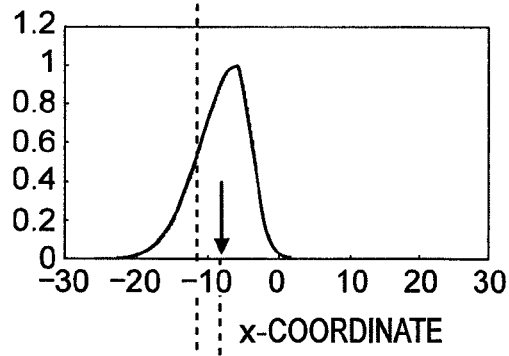
Figure 4F:
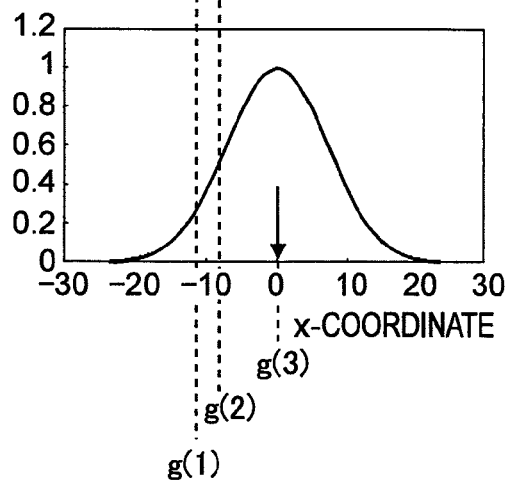

FIGS. 4A through 4I are diagrams illustrating a second method of position computation at the times t(1), t(2), and t(3) in FIGS. 3(b) through 3(d). FIGS. 4A through 4C show light spot images at the times t(1), t(2), and t(3), and graphs shown in FIGS. 4D through 4F show intensity distributions, along the x-direction, taken at a y-value at the times t(1), t(2), the t(3). Herein, the optical axis of the light emitted from the light emitting element 2 is set as the z-axis, the straight line being orthogonal to the z-axis and linking the light emitting element 2 and the light receiving element 3 is set as the x-axis (horizontal direction in FIGS. 4A through 4C), and a straight line extending through a point of intersection of the z-axis and the x-axis and being orthogonal to the z-axis and the x-axis is set as a y-axis (vertical direction in FIGS. 4A through 4C).

Figure 4G:
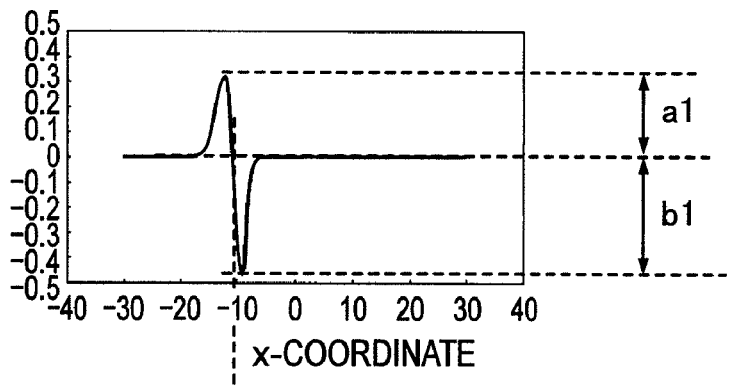
Figure 4H:
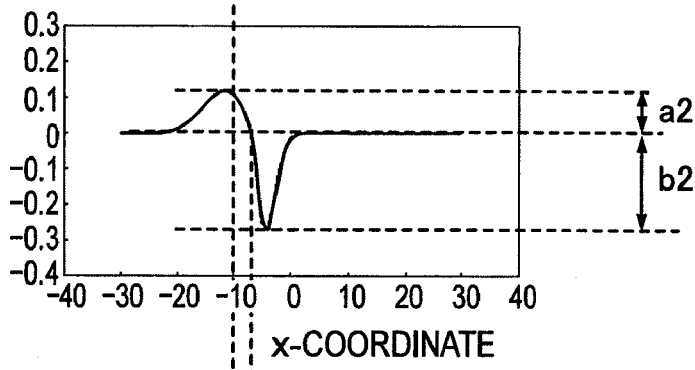
Figure 4I:
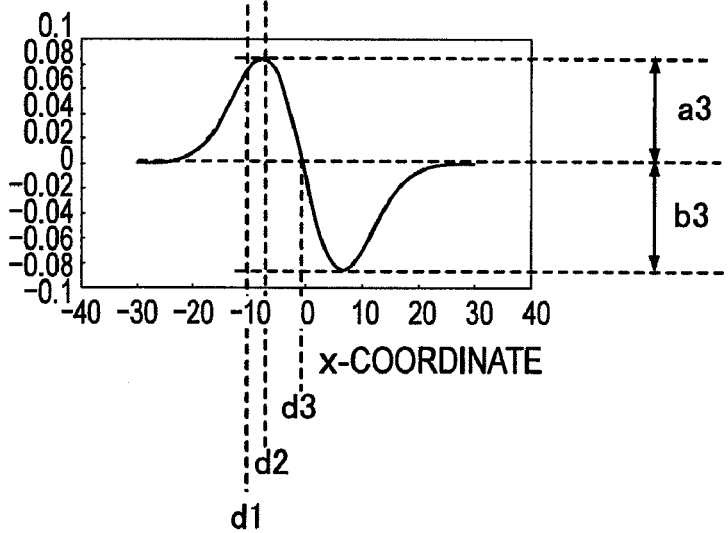

Graphs shown in FIGS. 4G through 4I show differential profiles (space differentiation waveforms) as a result of differentiation of the light spot profiles shown in FIGS. 4D through 4F with respect to x.

Output of the light receiving element 3 that is the image sensor is discrete data. Therefore, processing of calculating the differentiation waveforms is attained simply by calculation of differences between output intensities of adjacent pixels. Thus the differentiation waveforms can be obtained from such simple signal processing. At the time t(3), the reflection of the whole bundle of rays provides a perfect-circle-like spot as shown in FIG. 4C and a symmetrical light spot profile as shown in FIG. 4F, resulting in a differentiation waveform in which a positive waveform and a negative waveform have the same shape, as shown in FIG. 4I.

As the light spot wanes through the times t(2) or t(1), the shape of the light spot having waned becomes steep as shown in FIGS. 4E and 4D and thus results in difference between shapes of a positive waveform and a negative waveform of a differentiation waveform as shown in FIGS. 4H and 4G. A position of the object H to be measured can be detected by, as shown in FIGS. 4G through 4I, detecting from the calculated differential profile a positive peak 'a' and a negative peak 'b' of the differential profile, and calculating a ratio of a to b (a/b), a difference to sum ratio ((a−b)/(a+b)), and the like, for instance.

Figure 5A:
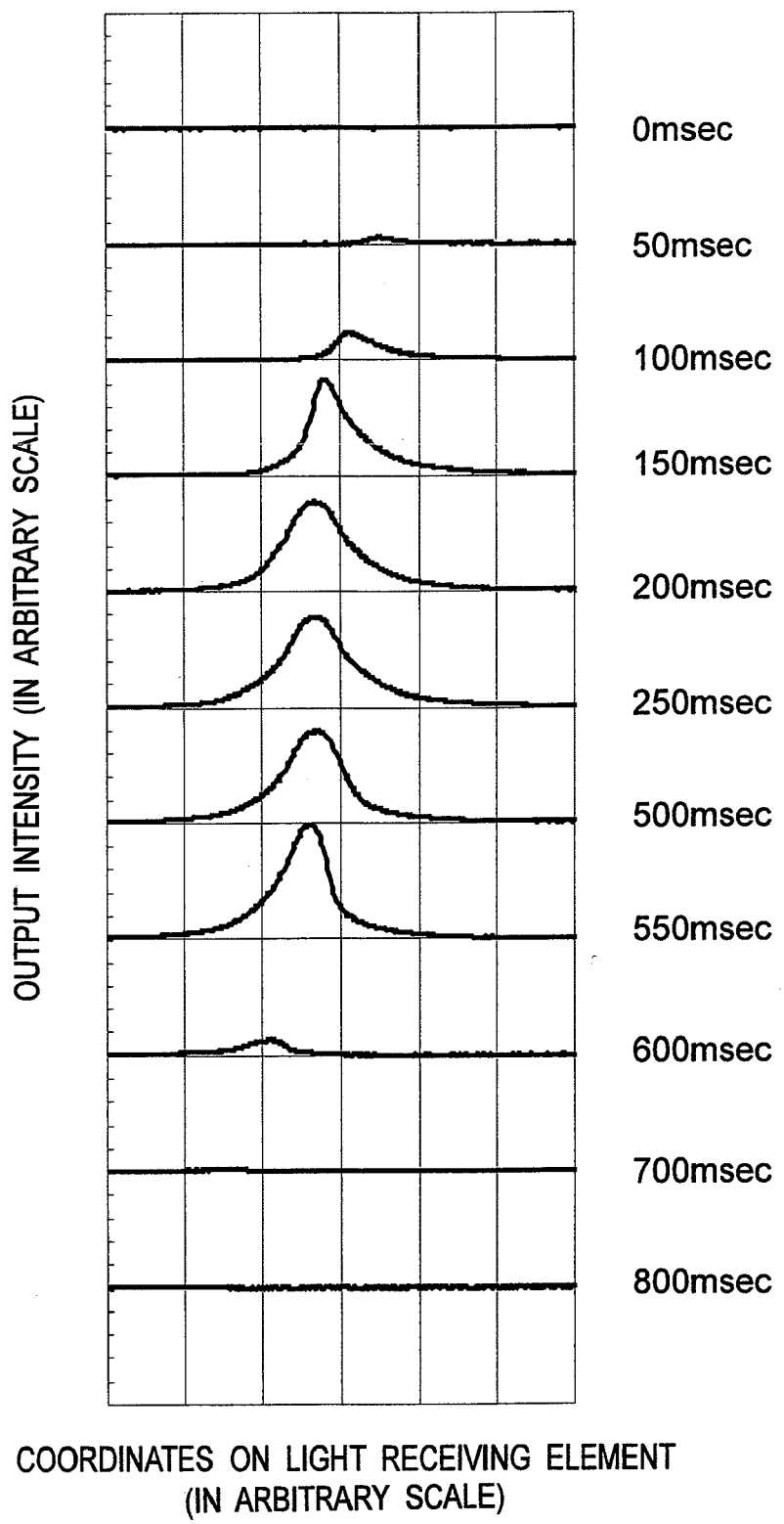
FIG. 5A is a chart showing time dependence of the light-spot profile when an object to be measured for the optical detection device is made to run across in front of the optical detection device at an arbitrary speed.
Figure 5B:
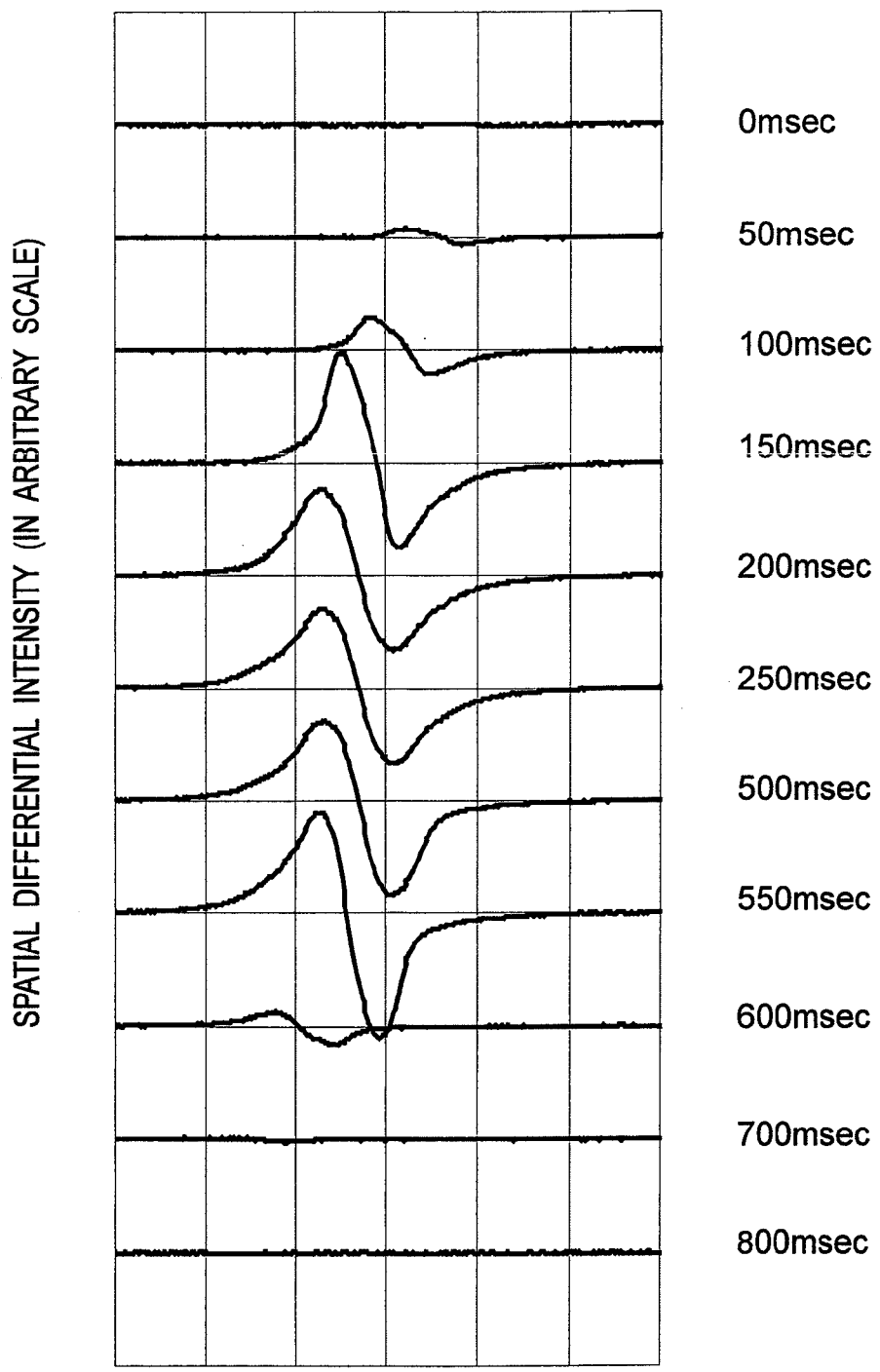
FIG. 5B is a chart showing a differential profile (spatial differentiation waveform) of the light-spot profile shown in FIG. 5A.

FIG. 5A shows time dependency of light spot profiles under conditions that an object H to be measured is made to cross front side of the optical position detecting device at a velocity, and FIG. 5B shows differential profiles (space differentiation waveforms) thereof. In FIGS. 5A and 5B, horizontal axes represent coordinates (in arbitrary scale) on the light receiving element and vertical axes represent output intensities (in arbitrary scale).

FIG. 6 shows time dependency of the difference to sum ratio of a positive peak and a negative peak in FIG. 5B. In FIG. 6, the horizontal axis represents time (msec) and the vertical axis represents the difference to sum ratio of the positive peak and the negative peak.

As shown in FIG. 6, it can be determined, when the difference to sum ratio is positive, that the object H to be measured is positioned on one side of the optical axis (z-axis) of the emitted light from the light emitting element 2, and it can be determined, when the difference to sum ratio is negative, that the object H to be measured is positioned on the other side thereof. In vicinity of t=0 msec and t=800 msec, where intensities of received light are weak, the ratio is forced to be 0.2 and −0.2, respectively, for prevention of misdetection. The position with respect to the optical axis (z-axis) of the emitted light can be detected on basis of the difference to sum ratio, provided that threshold values are set for sufficiently large intensities of the light reception signal so that ranges not more than about 100 msec and not less than about 600 msec in FIG. 6 where the calculation results are unstable are forcibly fixed at constant values (e.g., 0.2 or −0.2 as described above).

In the second method of position computation, as described above, a position of the object H to be measured can be detected only by performing simple calculation on light spot data in the signal processing unit 7.

(Third Method of Position Computation)

A third method of position computation will be described with reference to FIGS. 4A through 4I. As in the light spot profiles of FIGS. 4D through 4F, positions of centers of the distribution of the profiles on the x-coordinates differ according to positions of the object H to be measured (the positions of the centers at the times t(1), t(2), and t(3) in FIGS. 4D through 4F are g(1), g(2), and g(3), respectively). A position of the object H to be measured can be detected by detection of a position of the center on basis of barycentric calculation in the signal processing unit 7.

FIG. 7 shows change in barycentric coordinates of the light spot profiles of FIG. 5A. In FIG. 7, the horizontal axis represents time (msec) and the vertical axis represents the barycentric coordinates (in arbitrary scale).

As shown in FIG. 7, the barycentric coordinates are divided into a large value range and a small value range that border each other at the coordinate of 750 corresponding to the time in vicinity of 400 msec at which the object H to be measured is irradiated with the whole bundle of emission rays. As in the second method of position computation, a position (x-coordinate) of the object H to be measured with respect to the optical axis (z-axis) of the emitted light can be detected on basis of the barycentric coordinate only by simple calculation in the signal processing unit 7, provided that unstable status with sufficiently small intensities of the light reception signal is excluded by setting of appropriate threshold values or the like.

(Fourth Method of Position Computation)

A fourth method of position computation will be described with reference to FIGS. 4A through 4I. As in the third method of position computation, centers of the distribution of the profiles differ according to positions of the object H to be measured as in the light spot profiles of FIGS. 4D through 4F, and thus a position of the object H to be measured can be detected by detection of a position of a peak of a light spot profile. Specifically, the detection can be attained by detection of an x-coordinate (zero-crossing point: d1, d2, d3) where a differentiation waveform is inverted between positive values and negative values, as shown in FIGS. 4G through 4I. Description with reference to FIG. 5 is omitted.

(Fifth Method of Position Computation)

A position of the object H to be measured can more reliably be detected by appropriate use of a plurality of positions determined by the first through fourth methods of position computation described above and by use of averaging process, combination or the like of the positions.

Figure 8A:
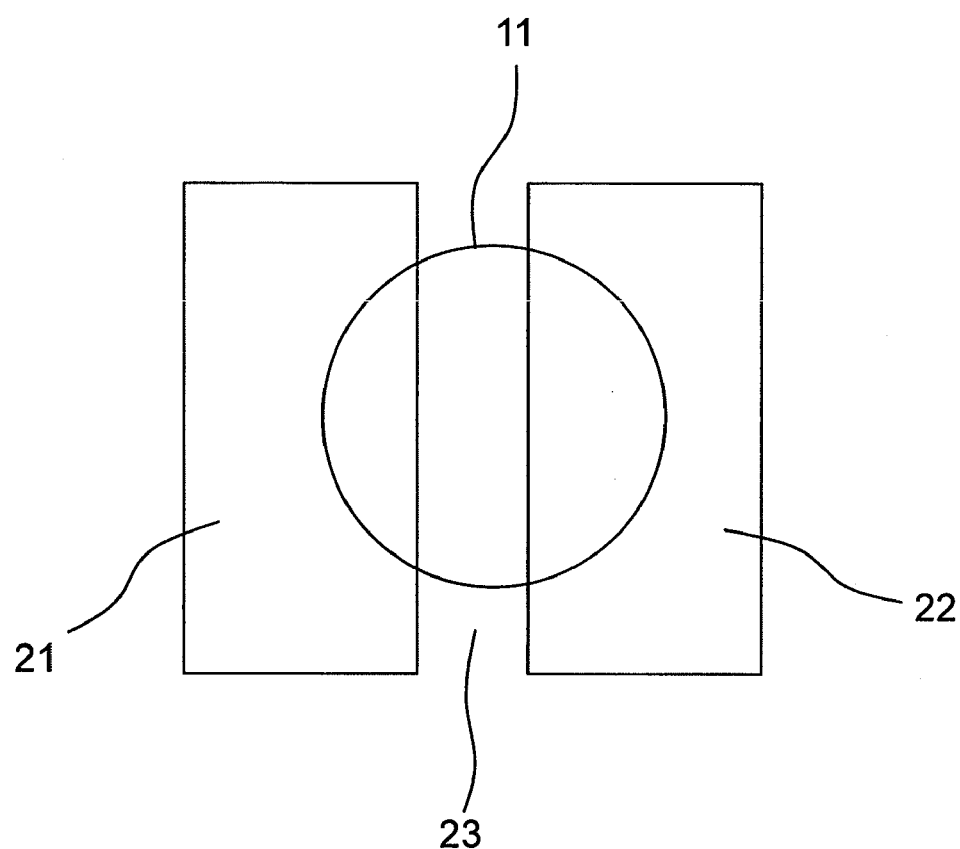
FIG. 8A is a view for explaining the principle of error detection in the optical detection device.
Figure 8B:
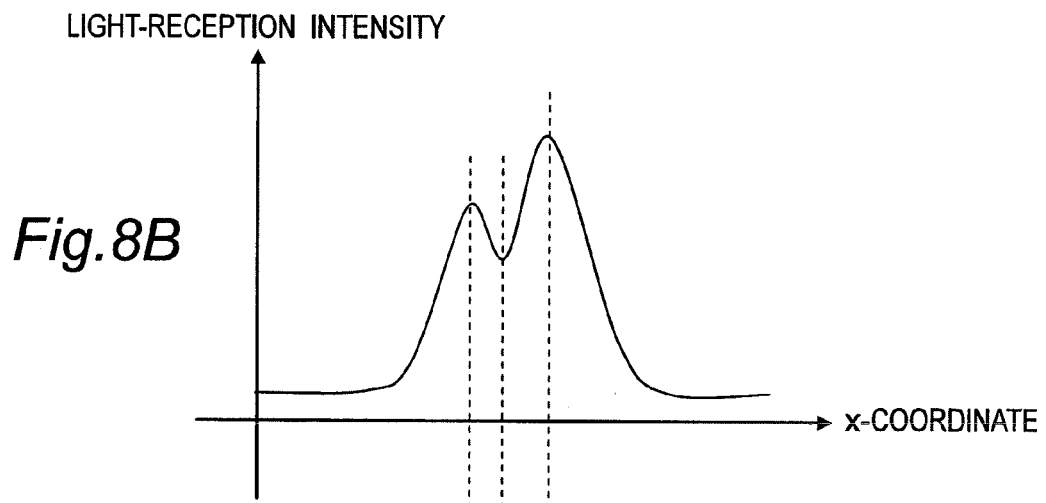
FIGS. 8B and 8C are charts showing a light-spot profile and a differential profile.
Figure 8C:
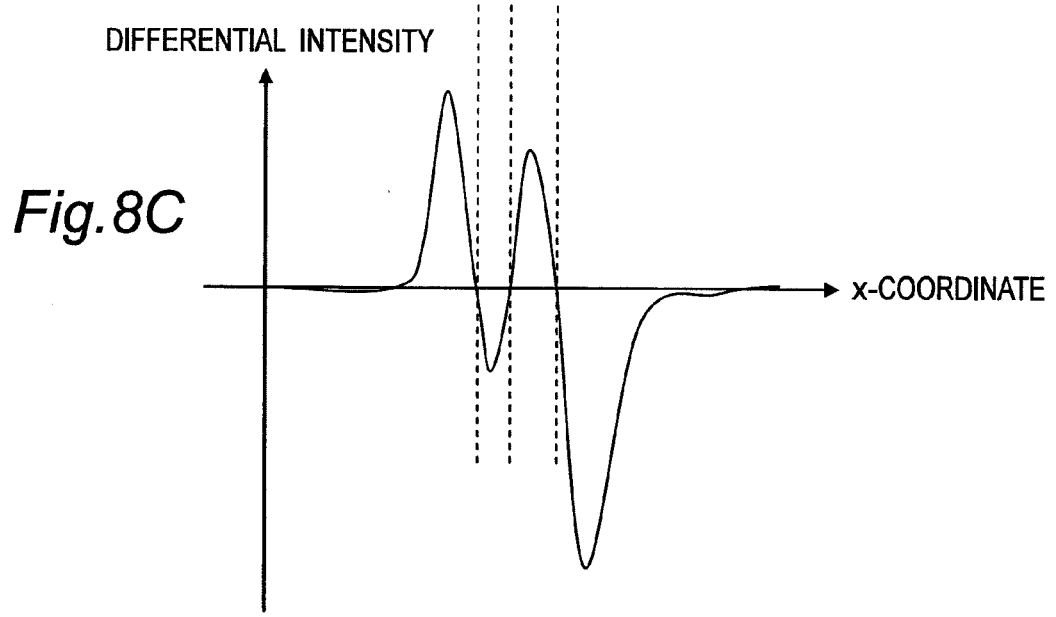

On the condition that the object H to be measured has different reflectances along the x-axis direction in the first through fourth methods of position computation, e.g., on the condition that the object H to be measured has a center part 23 having a low reflectance between reflection regions 21, 22 as shown in FIG. 8A, an irradiation area 11 of the bundle of emission rays from the light emitting element 2 that spreads over the reflection regions 21, 22 and the center part 23 results in a light spot profile recessed at center, as shown in FIG. 8B, on the light receiving element 3. In FIGS. 8B and 8C, horizontal axes represent x-coordinates (in arbitrary scale) and vertical axes represent light reception intensities, i.e., intensities of received light (in arbitrary scale) and differential intensities (in arbitrary scale), respectively.

Figure 8D:
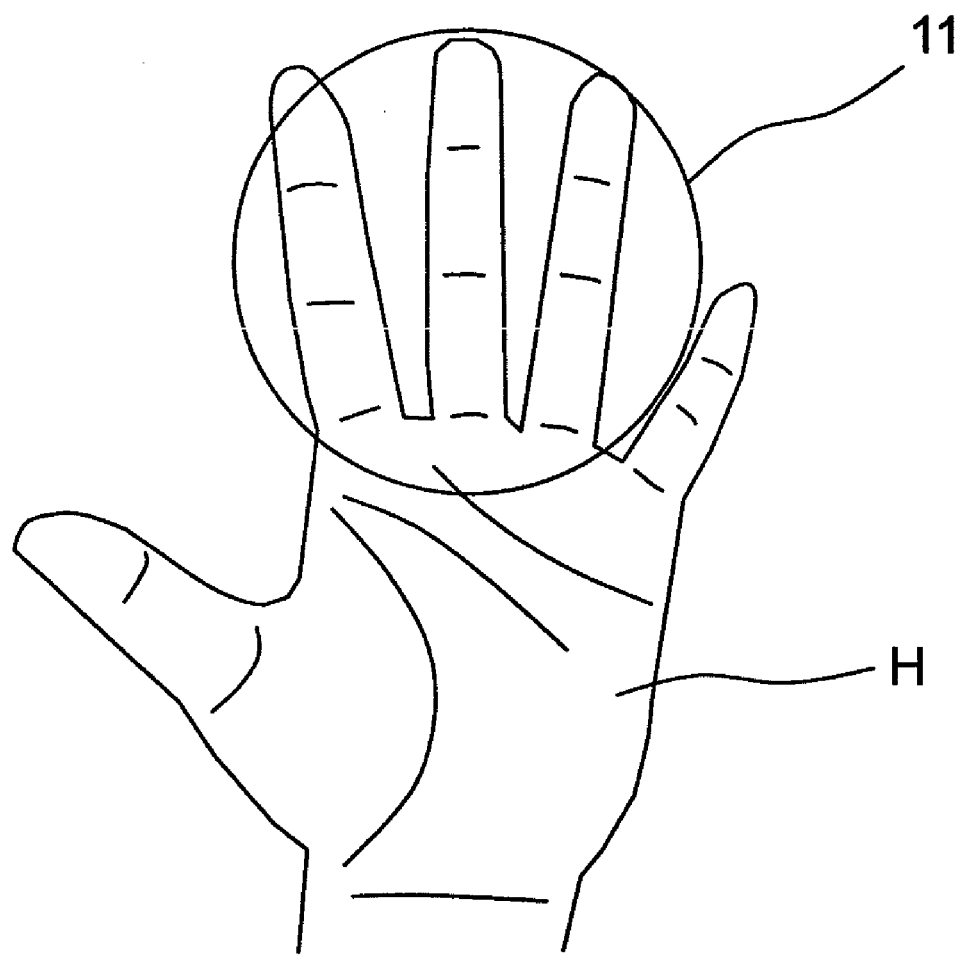
FIG. 8D is a view showing a case in which the device is controlled by hand motions in front of the optical detection device.

With application of the first through fourth methods of position computation to such a light spot profile, it is apparent that the method of detecting the barycentric position involves an error and that the method of detecting the positive and negative peak values and the method of zero-crossing detection from differential profiles resulting from space differentiation of such a light spot profile also involve errors. Malfunction of electronic equipment mounted with the optical detection device of the invention can be avoided by the signal processing unit 7 that declares an error when there are a plurality of peak values and a plurality of zero-crossing values in use of a differentiation waveform (FIG. 8C) of a light spot profile, for avoidance of such misdetection. Assuming that equipment is controlled on basis of a motion of a hand in front of the optical detection device as in FIG. 8D, the above condition corresponds to a case in which fingers of an operator are slightly spread, or the like.

The bundle of emission rays from the light emitting element 2 having a small angle of divergence increases a positional resolution but decreases a detection area. Besides, the object H to be measured that is moving fast cannot be detected.

Figure 9:
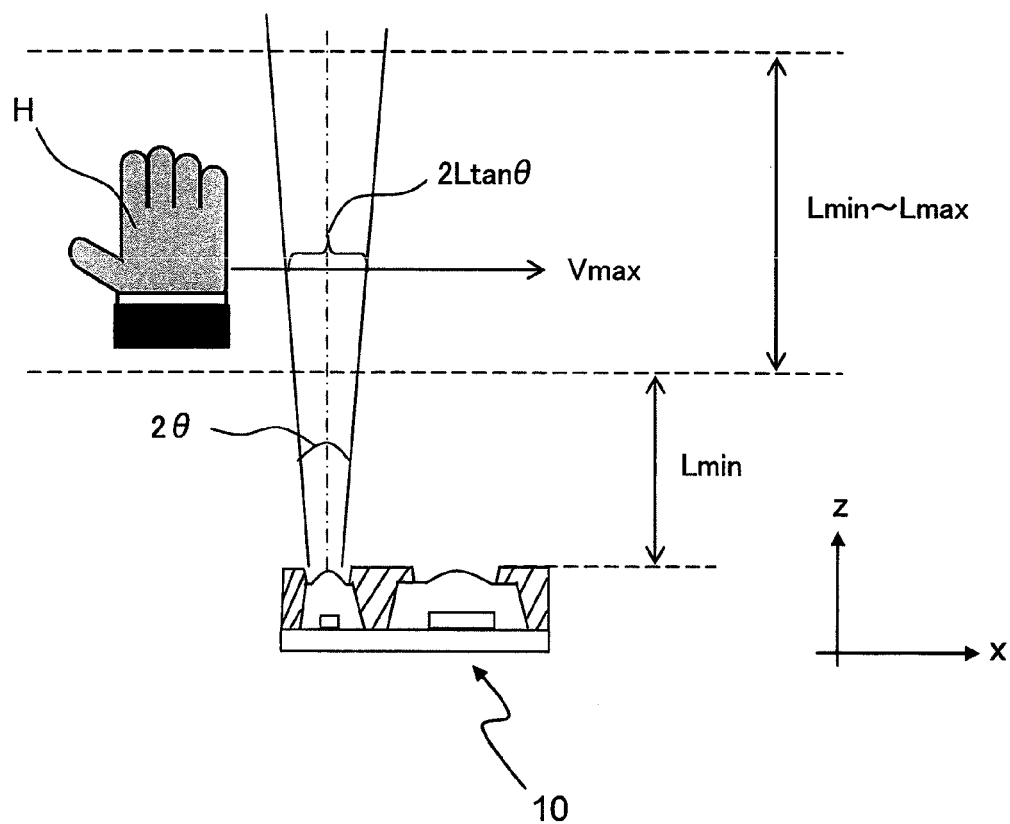
FIG. 9 is a view for explaining conditions required for the optical detection device.

As shown in FIG. 9, the angle of divergence of a bundle of emission rays emitted from the light emitting element 2 which angle centers on the optical axis is expressed as 2θ, a minimum detection area distance in the z-direction for the object H to be measured is designated by Lmin, a maximum moving velocity of the object H to be measured is designated by Vmax, and a measurement period for detection of positions of the object H to be measured is designated by T. In order that the measurement is executed at least one time while the object H to be measured crosses the bundle of emission rays, T and θ are required to satisfy the following condition.

$$T < \frac{2L_{min}\tan\theta}{V_{max}}$$

For the first embodiment, as discussed above, the optical detection device having the image sensor (area sensor) used as the light receiving element 3 has been described. As long as the intensity distribution of the light spot can be measured in one-dimensional manner, however, positions of the object H to be measured along the x-axis direction or the y-axis direction can be detected by the first embodiment. Therefore, a line sensor may be used as the light receiving element 3.

According to the optical detection device of the first embodiment, the small inexpensive optical detection device can be provided that is capable of easily detecting a motion of a hand or the like of a human by the simple configuration without complicated image signal processing circuits.

The signal processing unit 7 calculates a differentiation waveform of a light spot shape on the light receiving element 3 on basis of a light reception signal from the light receiving element 3, detects at least one of x-coordinate and y-coordinate of the object 20 to be measured, from a positive peak and a negative peak of the differentiation waveform, and is thereby capable of detecting positional information of the object 20 to be measured by the simple signal processing unit 7.

The signal processing unit 7 detects at least one of x-coordinate and y-coordinate of the object 20 to be measured, from a zero-crossing position of a differentiation waveform of a light spot shape that represents a light spot position on the light receiving element 3, and is thereby capable of detecting positional information of the object 20 to be measured by the simple signal processing unit 7.

The signal processing unit 7 detects at least one of x-coordinate and y-coordinate of the object 20 to be measured, from a barycentric position of a light spot that represents a light spot position on the light receiving element 3, and is thereby capable of detecting positional information of the object 20 to be measured by the simple signal processing unit 7.

Second Embodiment

Figure 10:
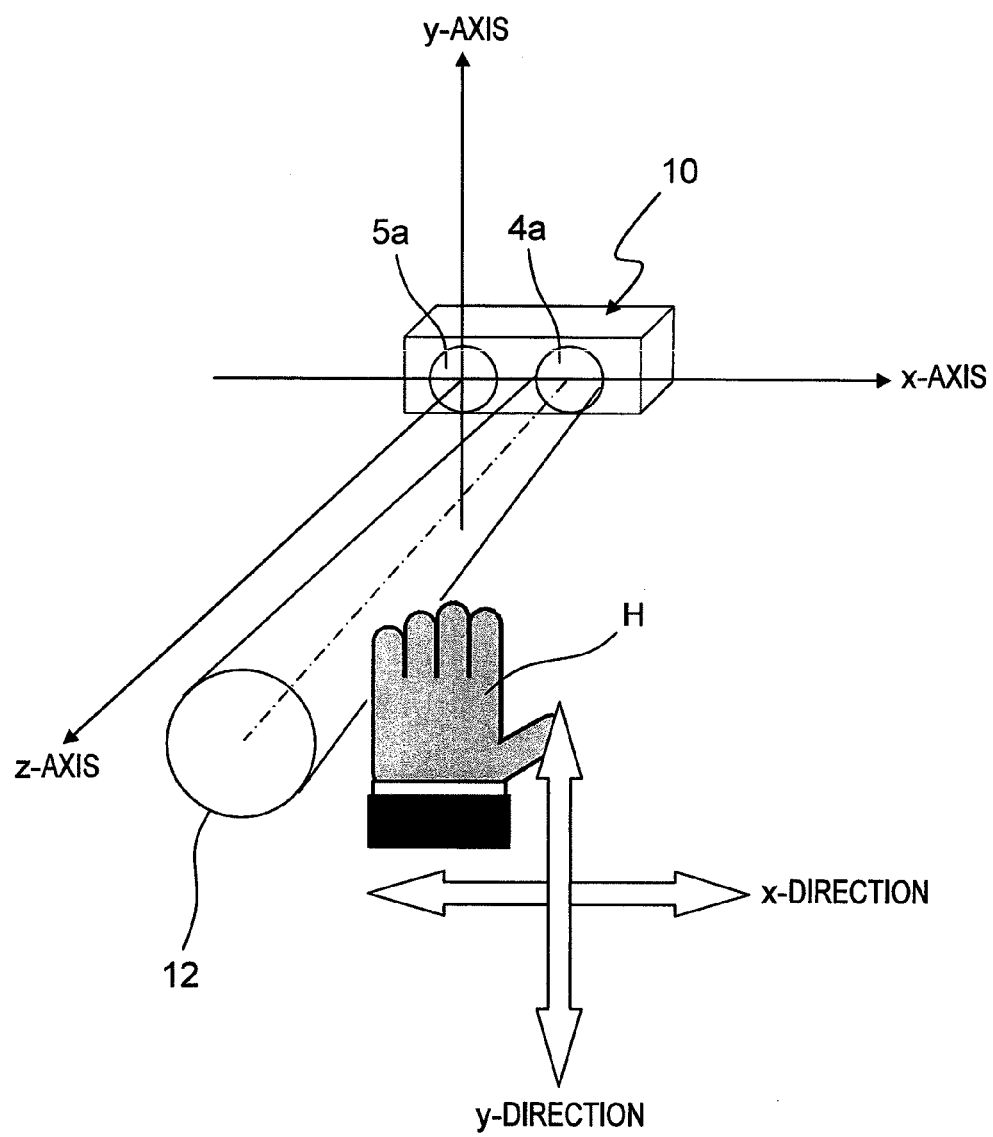
FIG. 10 is a view for explaining two-dimensional coordinate detection in an optical detection device according to a second embodiment of the invention.

FIG. 10 is a schematic view showing an optical detection device according to a second embodiment of the invention. The optical detection device 10 of this second embodiment is similar in configuration to the optical detection device 10 of the first embodiment, and so like component members are designated by like reference signs.

As shown in FIG. 10, a direction in which a light emitting lens part 4a and a light receiving lens part 5a of the optical detection device 10 are arrayed is assumed as an x-axis, a direction in which a bundle 12 of emission rays is emitted is assumed as a z-axis, and a straight line which is perpendicular to a plane containing the x-axis and the z-axis and which passes an intersection point of the x-axis and the z-axis is assumed as a y-axis. It is assumed that an object H to be measured (a human hand in this embodiment) is to make two-dimensional move, or motion, in the x- and y-directions along a plane of an arbitrary z-coordinate, as shown in FIG. 10.

Figure 11:
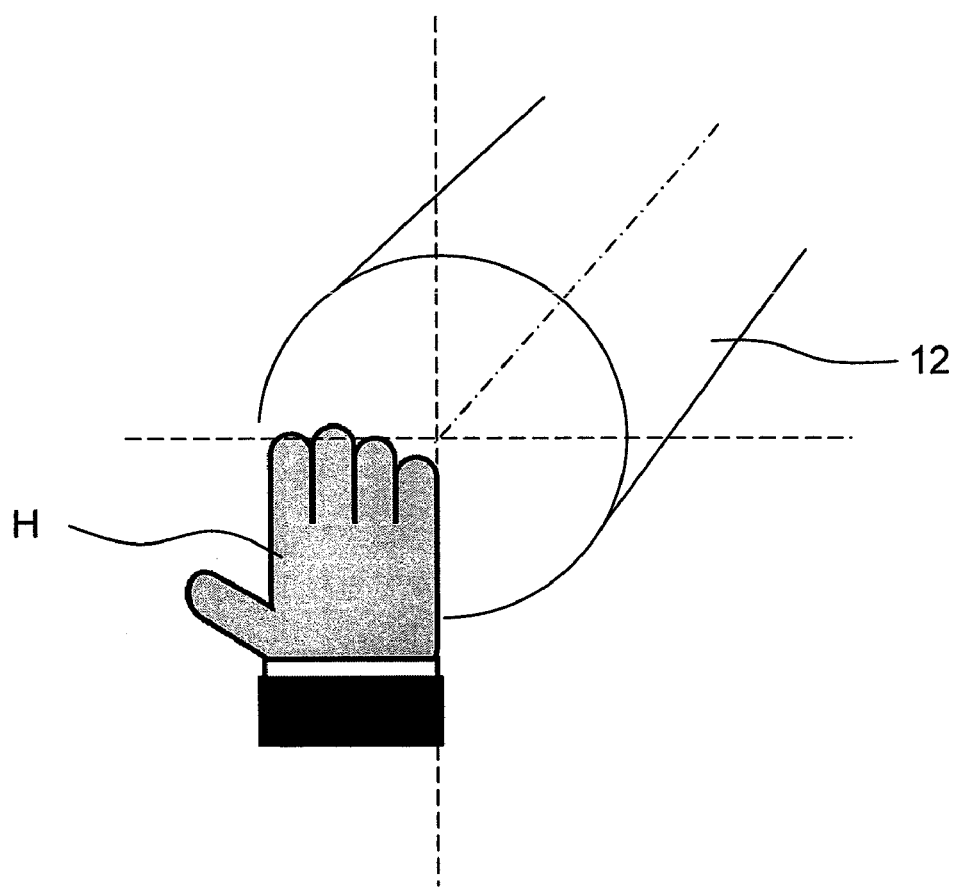
FIG. 11 is a view showing an example of the two-dimensional coordinate detection in the optical detection device.
Figure 12:
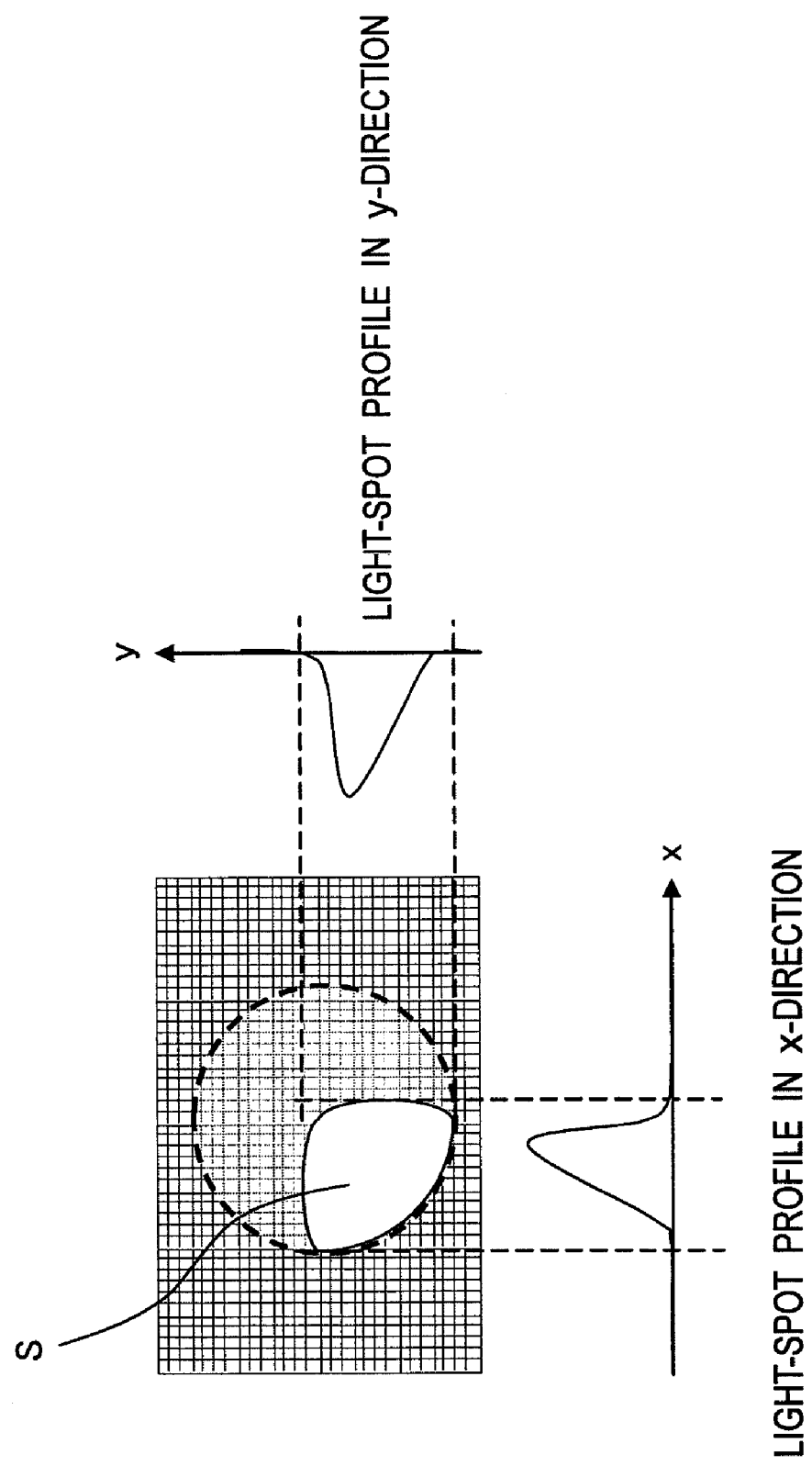
FIG. 12 is a view showing an example of a light spot of the two-dimensional coordinate detection in the optical detection device.

FIG. 11 shows a case in which the object H to be measured is irradiated with about ¼ of the bundle 12 of emission rays. In this case, as shown in FIG. 12, on a light receiving element 3 (image sensor), a light spot image S is formed in a partial area of a perfect circle which results from irradiation of the entire bundle of emission rays on the object H to be measured. This second embodiment differs from the first embodiment in that in addition to the position detection of the first embodiment, in which a position of the object H to be measured is detected for the x-axis, similar position computing process is performed also for the y-axis direction, thus making it possible to detect a two-dimensional position (x-coordinate and y-coordinate) of the object H to be measured.

More specifically, as shown in FIG. 12, a light-spot profile is extracted at a y-coordinate, and one of the first to fifth methods of position computation of the first embodiment is performed for the x-axis direction, so that an x-direction position (x-coordinate) of the object H to be measured is detected. Further, a light-spot profile is extracted at an arbitrary x-coordinate, and one of the first to fifth methods of position computation of the first embodiment is performed for the y-axis direction, so that a y-direction position (y-coordinate) of the object H to be measured is detected. Thus, a position (x-coordinate, y-coordinate) of the object H to be measured is detected.

The optical detection device of the second embodiment as described above has the same effects as those of the optical detection device of the first embodiment.

Figure 13:
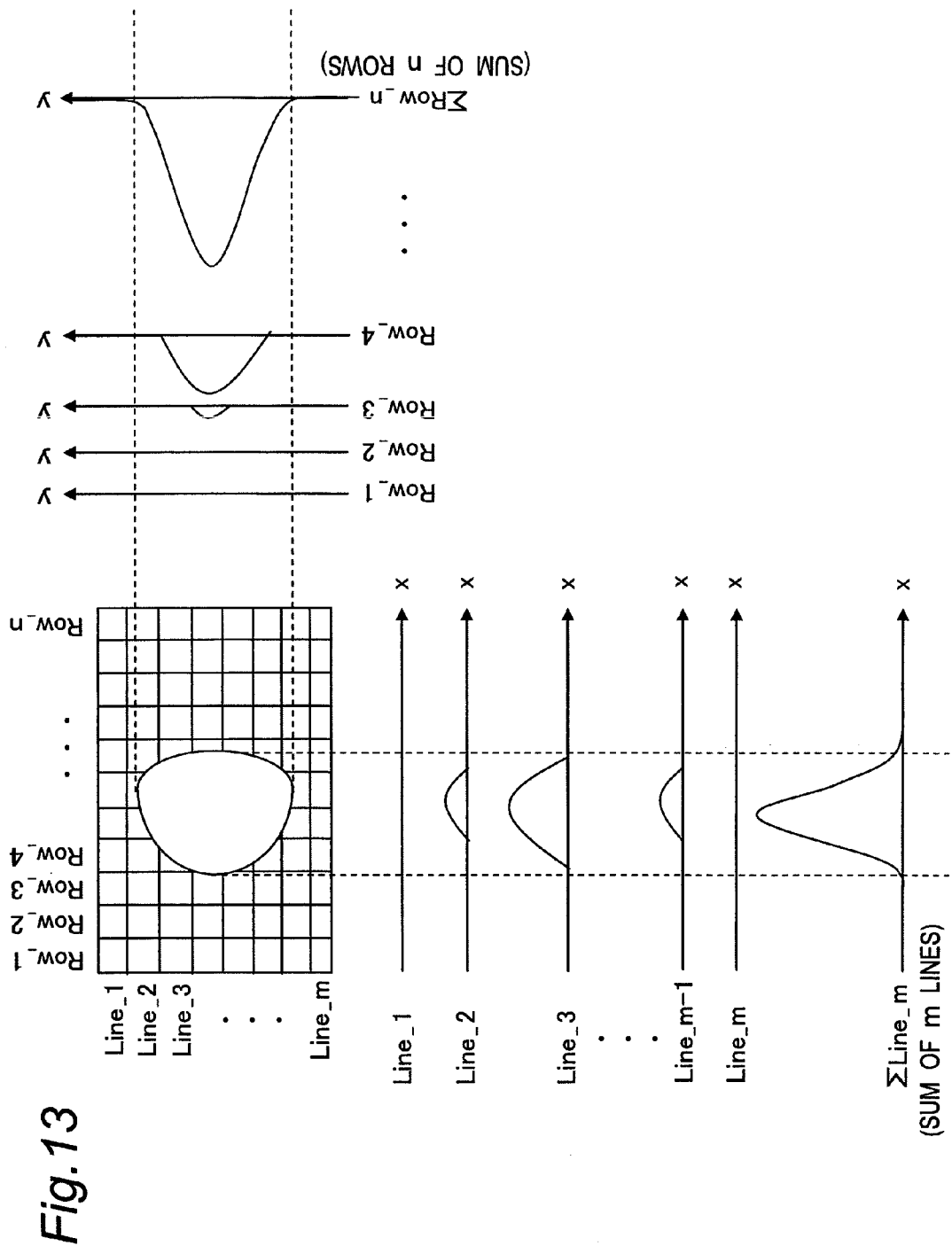
FIG. 13 is a view for explaining signal integration by line (row) integration in the optical detection device.

Also, as shown in FIG. 13, in the signal processing section 7, profiles extracted at individual rows (Row_1, Row_2, ..., Row_n) and individual lines (Line_1, Line_2, ..., Line_m) are summed up, by which a sum of n rows, ΣRow_n, and a sum of m lines, ΣLine_m, are obtained. A two-dimensional position (x-coordinate, y-coordinate) of the object H to be measured is detected based on the sum ΣRow_n of n rows and sum ΣLine_m of m lines, so that a signal intensity usable for computations is increased, making it possible to detect the positioned of the object H to be measured with high accuracy.

In the light receiving element 3, with use of an area sensor in which a plurality of pixels are arrayed in lines and rows in a grating form, one of the first to fifth methods of position computation of the first embodiment is performed in the line direction and the row direction of the area sensor, making it possible to detect two-dimensional coordinates (x-y coordinates) of the object 20 to be measured. Thus, there can be provided an optical detection device capable of detecting two-dimensional coordinates with a simple signal processing section 7.

Third Embodiment

Figure 14:
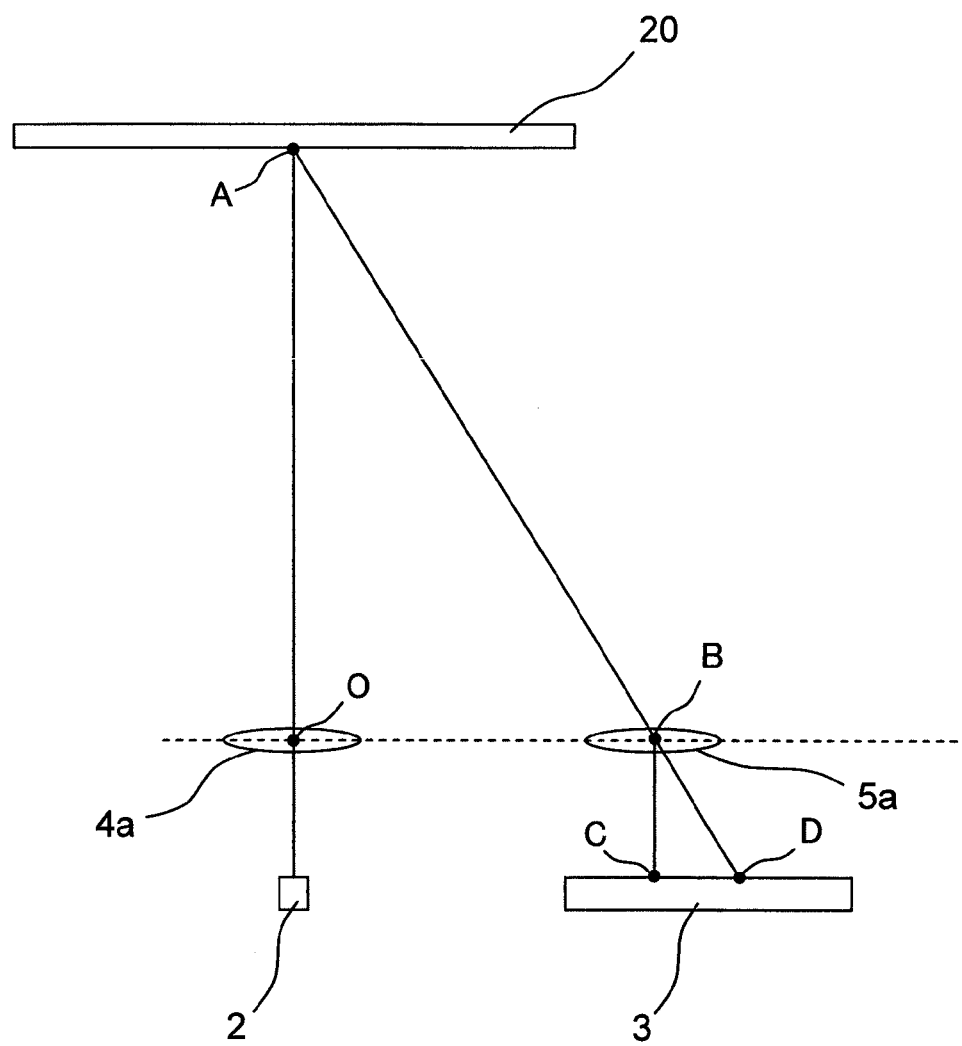
FIG. 14 is a schematic view showing an outlined configuration of an optical detection device according to a third embodiment of the invention.

FIG. 14 is a schematic view showing an outlined configuration of an optical detection device according to a third embodiment of the invention. The optical detection device of this third embodiment is similar in configuration to the optical detection devices of the first and second embodiments except the computational function of the signal processing section 7 (shown in FIG. 2), and so like component members are designated by like reference signs. The signal processing section 7 of the optical detection device of the third embodiment has a function of computing a distance from a light-spot position on the light receiving element 3 to the object 20 to be measured, differing in this point from the optical detection devices of the first and second embodiments.

As shown in FIG. 14, a point O is a center of the light emitting lens part 4a, a point A is a point at which an axis of light emission intersects with the object 20 to be measured, a point B is a center of the light receiving lens part 5a, a point C is a point at which a light receiving surface and a line parallel to the optical axis intersect each other, and a point D is a reflected spot-light position on the light receiving element 3. A base line length OB is determined by the optical system, and a line segment BC is a focal length of the light receiving lens part 5a. The light-spot position on the light receiving element 3 is detected, and the line segment CD is determined, by which, because $\triangle OAB$ and $\triangle CBD$ are similar figures, a distance OA to the object 20 to be measured can be determined by the following equation:

$$OA = \frac{OB \cdot BC}{CD}$$

The signal processing section 7 detects the distance (z-coordinate) to the object 20 to be measured by using the above equation. Thus, since the x-coordinate, the y-coordinate and the z-coordinate of the object 20 to be measured can be determined by the second embodiment plus this third embodiment, a spatial position of the object 20 to be measured can be detected.

The optical detection device of the third embodiment has the same effects as those of the optical detection device of the first embodiment.

Also, from a spot position on the light receiving element 3, the distance (z-coordinate) to the object 20 to be measured is detected by the signal processing section 7 based on the triangulation method. Therefore, three-dimensional coordinates of the object 20 to be measured can be detected by the signal processing section 7 of simple configuration.

Figure 15:
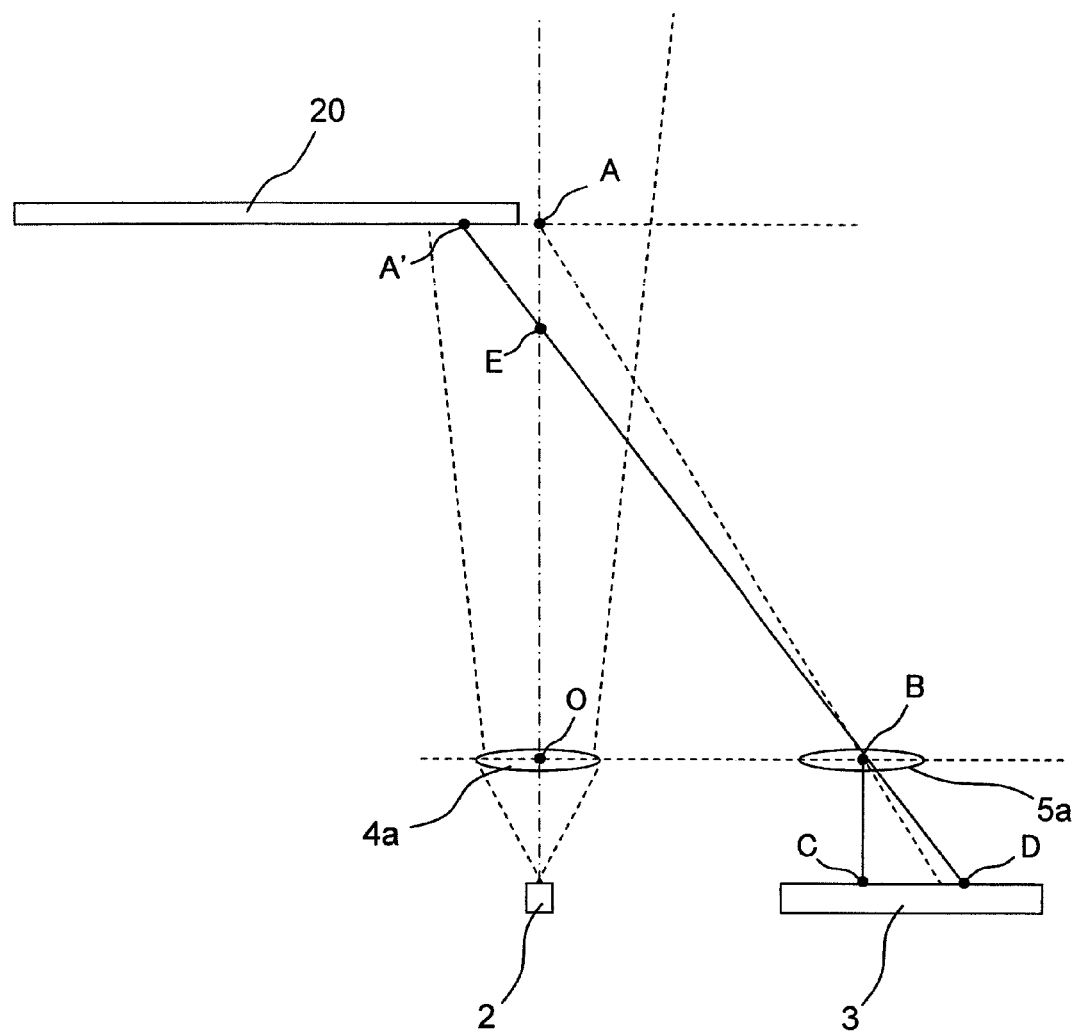
FIG. 15 is a view for explaining conditions in z-coordinate detection in the optical detection device.

For detection of the z-coordinate with use of the triangulation method, as shown in FIG. 15, when the object 20 to be measured is irradiated with part of the bundle of emission rays, a light-spot position D on the light receiving element 3 falls on an intersection point at which a line interconnecting a point A' on the object 20 to be measured and the center B of the light receiving lens 5a intersects with the light receiving surface, which is not on the light receiving axis (drawn by broken line in the figure) that results when the object 20 to be measured is irradiated with the entire bundle of emission rays. As a result of this, the object 20 to be measured whose z-coordinate is really at a distance OA is detected as if it were at a distance OE as shown in FIG. 15 by the triangulation method. For prevention of this misdetection, in the detection of the z-coordinate by the triangulation method, a spatial differentiation waveform of the spot profile is computed, where if positive and negative peak intensities are roughly equal to each other, then distance measurement (z-coordinate detection) is permitted and enabled, and if a positive-to-negative peak intensity ratio is equal to or more than a specified level, then the distance measurement (z-coordinate detection) is inhibited.

As shown above, since the detection of the distance (z-coordinate) to the object 20 to be measured is permitted when the positive and negative peak intensities of the spatial differentiation waveform of the light spot on the light receiving element 3 are roughly equal to each other, it becomes possible to prevent misdetections of distance measurement by the triangulation method.

Further, an x-coordinate, a y-coordinate and a z-coordinate detected in the first to third embodiments are stored in a memory, and compared to coordinates measured subsequently specified time later, respectively. Thereby, based on respective differences between the current x-coordinate and the previous x-coordinate detected the specified time before, between the current y-coordinate and the previous y-coordinate detected the specified time before, and between the current z-coordinate and the previous z-coordinate detected the specified time, moving information such as moving speed, moving extent and moving direction of the object to be measured are detected.

Thus, based on a difference in positional information of at least one of the x-coordinate and the y-coordinate of the object to be measured on the x-y coordinate plane between start and end of a specified time period, at least one of moving direction and moving speed of the object to be measured is detected by the signal processing section, making it possible to detect moving information of the object to be measured with a simple signal processing section.

In the first to third embodiments, the light emitting lens part 4a formed in the light-pervious resin part 4 is used as the irradiation optical system, and the light receiving lens part 5a formed in the light-pervious resin part 5 is used as the reflected light optical system. However, without being limited to these, the irradiation optical system and the reflected light optical system may be provided in a way that a substrate having a light emitting element and a light receiving element mounted thereon is covered with a holder having a light emitting lens and a light receiving lens fitted thereon. In this case, the light beam emitted from the light emitting element can be throttled narrower so that parallel light can be emitted, and moreover the light spot formed on the light receiving element can be narrowed. As a result, it becomes possible to detect more distant objects to be measured, with the detection accuracy improved.

Fourth Embodiment

Figure 16A:
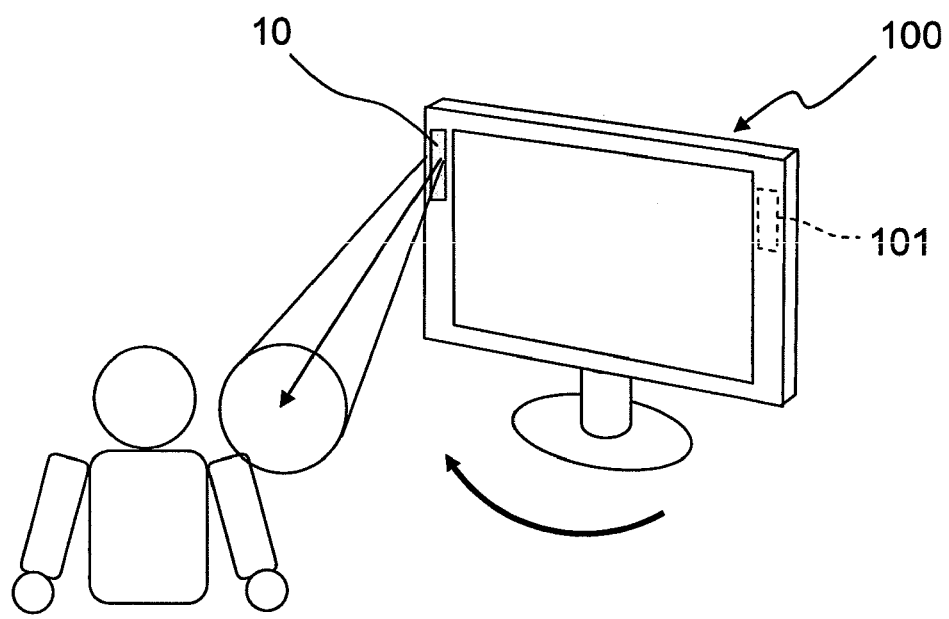
FIG. 16A is a view showing a television set as an example of electronic equipment on which an optical detection device according to a fourth embodiment of the invention is mounted.
Figure 16B:
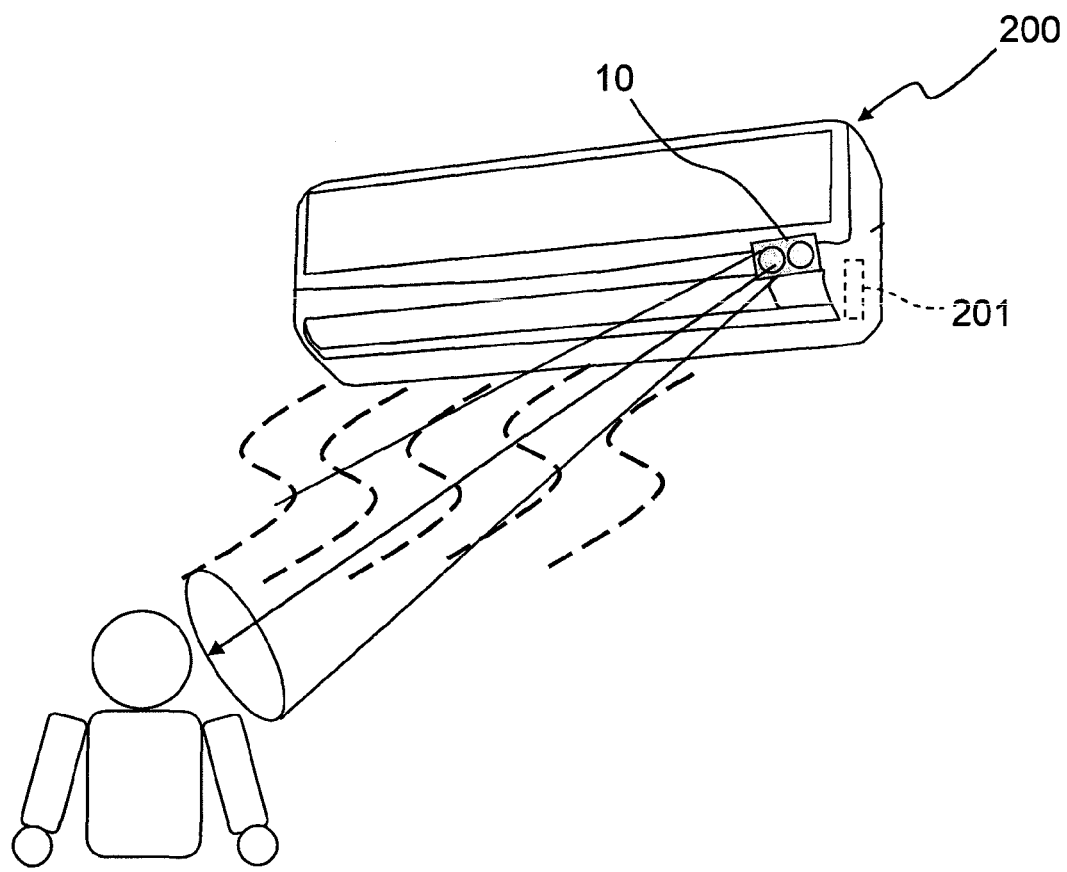
FIG. 16B is a view showing an air conditioner as an example of electronic equipment on which the optical detection device of the fourth embodiment of the invention is mounted.

FIGS. 16A and 16B show a television set and an air conditioner, respectively, which are examples of electronic equipment each with the optical detection device mounted thereon.

The television set 100 and the air conditioner 200 shown in FIGS. 16A and 16B include control units 101, 201, respectively, for controlling operating state based on positional information of an object to be measured detected by the optical detection device 10. In the television set 100 and the air conditioner 200, a bundle of emission rays emitted from the optical detection device 10 is applied to a human, and a position at which the human is present is detected from a light-spot image of reflected light reflected from the human. The television set or the air conditioner operates so that the television screen is directed toward the human, or that the direction or quantity of wind, temperature or the like of the air conditioner is adjusted.

According to the television set 100 and the air conditioner 200, which are examples of the electronic equipment of the fourth embodiment, since the position of the object to be measured such as a human hand can be recognized by the optical detection device 10, it becomes possible to control the operating state relative to motions of the hand. Thus, it becomes possible to operate the television set 100 and the air conditioner 200 in noncontact manner.

The electronic equipment on which the optical detection device of the invention is to be mounted is not limited to the television set 100 or the air conditioner 200, and the optical detection device of the invention may be applied to other electronic equipment such as electric fans, acoustic equipment, digital cameras and video cameras.

For example, it becomes possible for an electric fan to apply air flow selectively in the human's direction, or for a stereo or other acoustic equipment to detect a human's position and reproduce a sound field best suited for the human, or for a digital camera or a video camera to automatically direct a photographing direction along the human's direction as the camera is set on the tripod for photographing of the photographer himself or herself, without the photographer's adjusting the photographing range.

Thus, there can be realized electronic equipment which is convenient to use and comfortable for the user by detection of a human's direction and performing adjustment to attain an optimum operating state for the direction.

Fifth Embodiment

Figure 17:
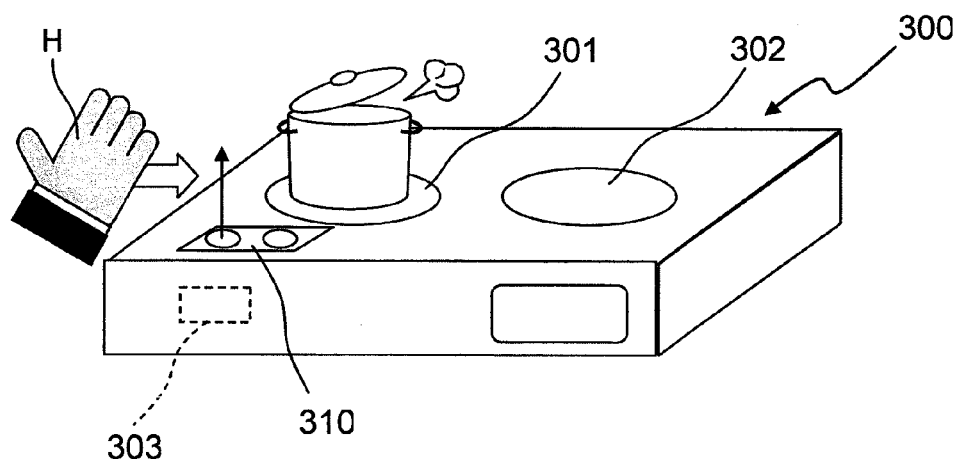
FIG. 17 is a view for explaining a system kitchen as an example of electronic equipment according to a fifth embodiment of the invention.

FIG. 17 shows a system kitchen 300 as an example of the electronic equipment on which an optical detection device according to a fifth embodiment of the invention is mounted.

In this system kitchen 300, as shown in FIG. 17, an optical detection device 310 is mounted in a portion of main-unit top surface with cookstoves 301, 302 placed thereon, and a bundle of emission rays is emitted upward. Also, the system kitchen 300 includes a control unit 303 for controlling the operating state based on positional information of an object H to be measured detected by the optical detection device 310. When the object to be measured H (hand) is moved across the bundle of emission rays of the optical detection device 310, the control unit 303 performs control so as to increase the heating power for a hand's move from right to left and to lower the heating power for a hand's move from left to right, as an example.

In this case, mis-operations can be prevented by detecting a moving speed of the object to be measured H (hand), where when the hand has moved across at a speed equal to or higher than a threshold value, it is decided as an unintentional passage through the detection area, and when the hand has moved across at a low speed lower than the threshold value, it is decided as an intentional passage for controlling the cookstove 301 (or 302).

Further, as safety measures for preventing mis-operations, a function of controlling the adjustment of heating power is set active by holding the hand over and above the optical detection device 310 in a fixed state (specified state) during a certain time duration, so that unintentional operations can be prevented.

Also, there are some cases where the adjustment of heating power is insufficient with one-time passage of the object to be measured H (hand), where when the passage motion is performed in succession, holding the cookstove 301 (or 302) continued in a heating power adjustment mode for time durations longer than necessary may lead to a risk of detecting an unintentional operation. Although the heating power adjustment mode can be turned off automatically by a timer function after a certain time elapse, yet a great convenience of use can be obtained when the heating power adjustment mode is turned off by holding the object H to be measured (hand) in an unchanged state for a certain time period, as in the case where the heating power adjustment mode is set active. In particular, for example, with a pot heated on the cookstove and during the course of other cooking or the like with hands dirty, it becomes possible to manage the pot without washing the hands by controlling the cookstove in noncontact manner as described above upon likeliness of boiling-over of the pot.

According to the system kitchen 300 that is an example of the electronic equipment of the fifth embodiment, a position of the object to be measured such as human hand can be recognized by the optical detection device 310, making it possible to adjust the operating state in response to the hand's motion. Thus, it becomes possible to operate the system kitchen 300 in noncontact manner.

Figure 18:
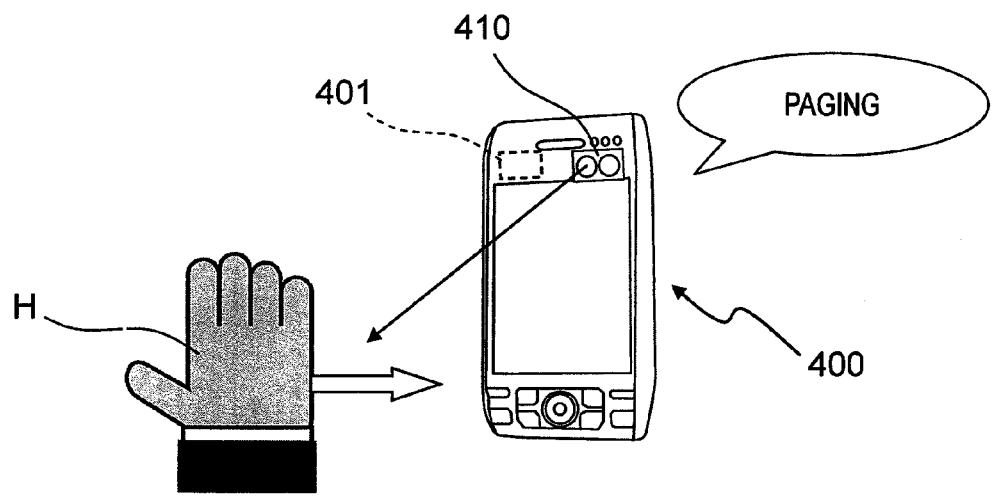
FIG. 18 is a view for explaining another state of use of the electronic equipment.

Although the fifth embodiment has been described on an example of control of cookstoves in a system kitchen or the like, yet it is effective in cases where a paging function of a mobile phone 400 is performed in noncontact manner as shown in FIG. 18. In FIG. 18, reference sign 410 denotes an optical detection device and 401 denotes a control unit.

For electronic equipment on which the optical detection device is mounted, the optical detection device is effective in performing in noncontact manner such feed functions as paging of digital photo frames or the like, volume control of acoustic equipment, channel switching of televisions, and the like.

Sixth Embodiment

Figure 19A:
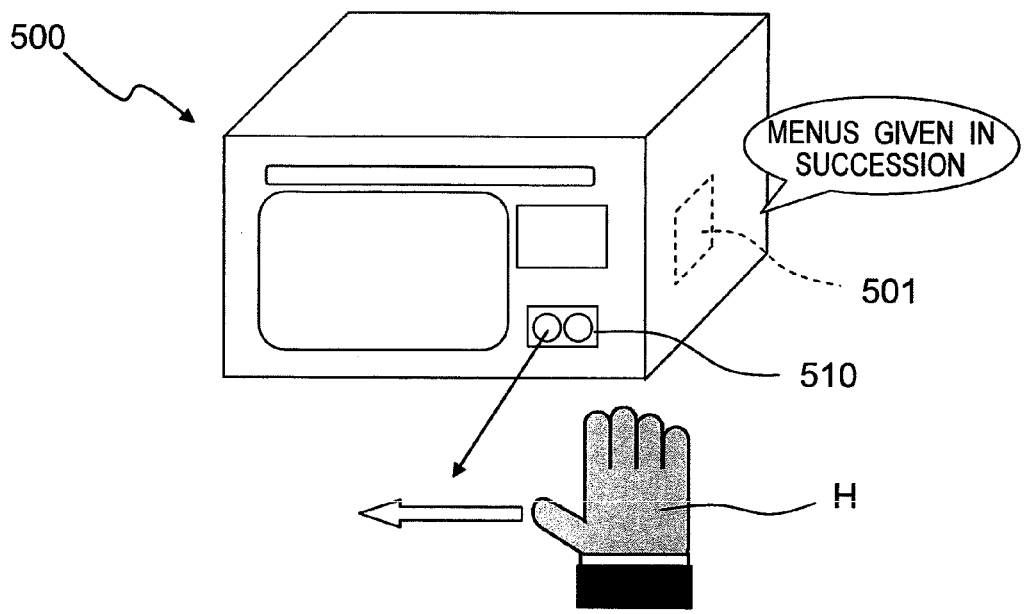
FIG. 19A is a view for explaining a state of use of electronic equipment according to a sixth embodiment of the invention.
Figure 19B:
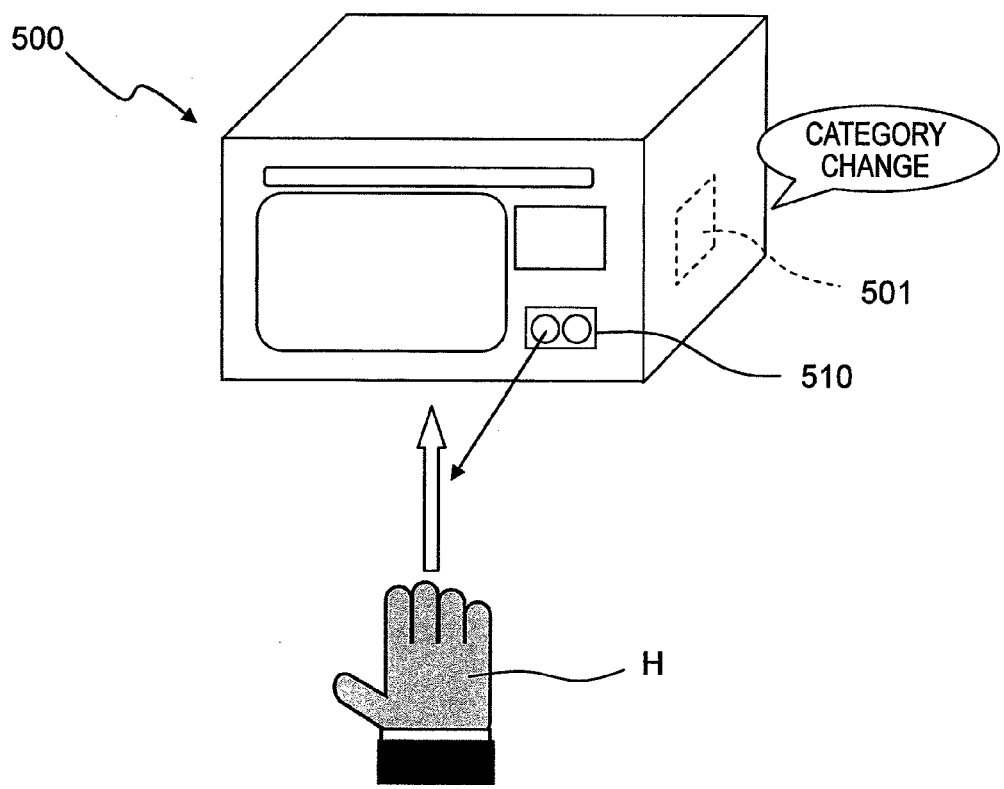
FIG. 19B is a view for explaining a state of use of the electronic equipment.
Figure 19C:
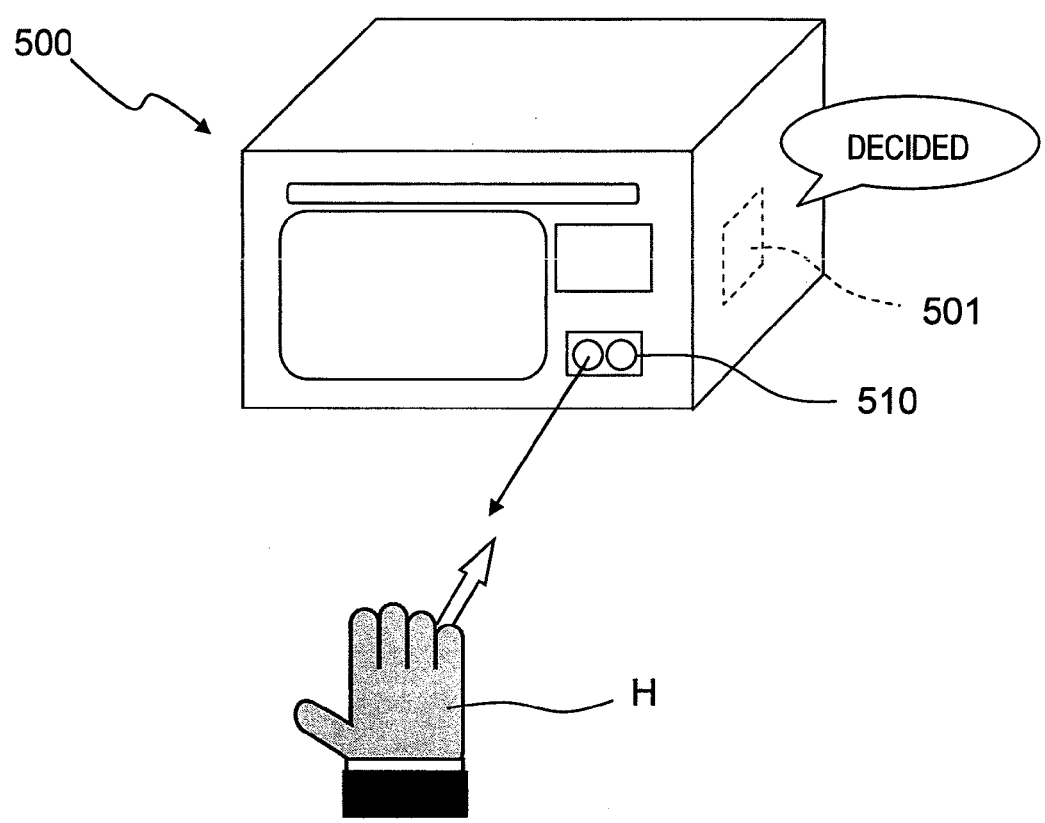
FIG. 19C is a view for explaining a state of use of the electronic equipment.

FIGS. 19A to 19C show a microwave oven 500 that is an example of electronic equipment on which an optical detection device of a sixth embodiment of the invention is mounted.

In this microwave oven 500 of the sixth embodiment, as shown in FIGS. 19A to 19C, the optical detection device 510 is mounted in the front, and a bundle of emission rays is emitted forward from the optical detection device 510. Also, the microwave oven 500 includes a control unit 501 for controlling operating state based on positional information of an object H to be measured detected by the optical detection device 510.

In recent years, microwave ovens have been advanced in functions so that the microwave ovens are provided with not only heating function but also grilling, boiling and other cooking functions. Among those, there have been commercially provided microwave ovens in which heating is automatically controlled by making the microwave oven operated by selection of menus with a cursor or the like.

However, the cursor to be used for selection of menus in microwave ovens as shown above, as it stands, is to be operated by human hand's contact with a dial type control, switch, button or the like. Unfortunately, it is often the case that hands are dirtied during the cooking, so that for continuous operation of the microwave oven, the hands need to be washed once before operation of the microwave oven.

In this sixth embodiment, the microwave oven 500 is operated by detecting motions of the object H to be measured (hand) by the optical detection device 510. For example, making the hand traverse the microwave oven 500 sideways as shown in FIG. 19A causes a high-order item of the menu ('heating,' 'grilling,' 'boiling,' etc.) to be selected. With a high-order item selected, the object H to be measured (hand) is moved in the up/down direction to select a low-order item.

For example, when the cursor is set to a high-order item 'grill' by transverse move of the object H to be measured (hand), the object H to be measured (hand) is moved vertically to select 'grilled fish.' Then, as shown in FIG. 19C, the object H to be measured (hand) is moved to approach the microwave oven 500, the motion being detected so that a cooking start is decided. Thus, it becomes possible to operate the microwave oven 500 in noncontact manner.

According to the microwave oven 500 as electronic equipment of the sixth embodiment, since the position of a object to be measured such as a human hand can be recognized by the optical detection device 510, it becomes possible to control the operating state in response to motions of the hand. As a result of this, noncontact operation of the microwave oven 500 becomes implementable.

Further, even if the object to be measured has unintentionally entered into the detection area of the optical detection device 510, the operating state of the microwave oven 500 is not changed, so that the microwave oven can be prevented from mis-operations. Moreover, when the operator redoes operation or performs continued operation, there is no need for setting the equipment control mode active for each operation, so that the microwave oven can be made more convenient for use.

In addition, in the microwave oven 500, it is also possible that the control unit 501 is permitted to control the operating state when it is discriminated that a preset state of the object to be measured has continued for a certain time period. In this case, even if the object to be measured has unintentionally entered into the detection area of the optical detection device 510, the operating state of the microwave oven 500 is not changed, so that the microwave oven can be prevented from mis-operations.

Moreover, when the object H to be measured (hand) is moved along the x-y coordinate plane, the control unit 501 successively feeds the menus of a plurality of operating states for controlling the microwave oven 500, based on an x-coordinate and a y-coordinate of the object to be measured detected by the optical detection device 510, where a desired function selected. Then, based on a z-coordinate of the object to be measured detected by the optical detection device 510, when it is discriminated that the distance to the object to be measured has changed to a predetermined condition, control of the operating state selected from the menus is executed, thus it being possible to effectively select and execute the desired function in noncontact manner.

This sixth embodiment has been described on a microwave oven as an example of electronic equipment on which the optical detection device is mounted. However, the optical detection device of this invention is effective for operations of car navigation equipment. In the current car navigation equipment, the map is scaled up or slid by touch panel or remote control to make search for information as to vicinities of a present location. This involves a risk or danger because the driver's eyes are drawn to the remote control or, in the case of touch panel type, the driving posture is changed because of a need for making touch with the screen or ascertaining the position of the screen.

In contrast to this, with the optical detection device provided in the front of the car navigation equipment, it becomes possible to operate the car navigation equipment for scale-up, determination and the like of the map by making the hand roughly traverse in front or approach the equipment. Thus, there can be provided car navigation equipment of high safety.

In other electronic equipment, by the setting that moving the hand in the traverse direction in front allows individual functions to be selected, and moving the hand in the approaching direction allows the decision command to be set, control for various equipment can be made more convenient for use, but individual detailed description thereof is omitted.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

| REFERENCE SIGNS LIST | |
|---|---|
| 1 | substrate |
| 2 | light emitting element |
| 3 | light receiving element |
| 4 | light-pervious resin part |
| 4a | light emitting lens part |
| 5 | light-pervious resin part |
| 5a | light receiving lens part |
| 6 | light-pervious resin part |
| 7 | signal processing section |
| 8 | driver |
| 10 | optical detection device |
| 11 | irradiation area |
| 12 | bundle of emission rays |
| 20 | object to be measured |
| 100 | television set |
| 101, 201, 303, 401, 501 | control unit |
| 200 | air conditioner |
| 300 | system kitchen |
| 400 | mobile phone |
| 500 | microwave oven |
| H | hand |

The invention claimed is:

1. An optical detection device comprising:
a light emitting element;
an irradiation optical system for applying a bundle of emission rays emitted from the light emitting element to an object to be measured;
a reflected light optical system for condensing reflected light from the object to be measured;
a light receiving element for detecting reflected light from the object to be measured condensed by the reflected light optical system; and
a signal processing section for processing a light-reception signal from the light receiving element, wherein
the light receiving element is a line sensor or area sensor for detecting an intensity distribution of reflected light from the object to be measured, and
given a z-axis that is an optical axis of a bundle of emission rays emitted from the light emitting element, an x-axis that is a straight line perpendicular to the z-axis and extending along a line direction interconnecting the light emitting element and the light receiving element, a y-axis that is a straight line passing through an intersection point of the z-axis and the x-axis and perpendicular to the z-axis and the x-axis, and given an x-y coordinate plane that is a plane containing the x-axis and the y-axis, then the signal processing section detects at least one of an x-coordinate and a y-coordinate of the object to be measured on the x-y coordinate plane from at least one of a light-spot position on the light receiving element or a light-spot shape on the light receiving element based on the light-reception signal received from the light receiving element.

2. The optical detection device as claimed in claim 1, wherein the signal processing section computes a differential waveform of the light-spot shape on the light receiving element based on the light-reception signal from the light receiving element, and detects at least one of the x-coordinate and the y-coordinate of the object to be measured from positive and negative peak intensities of the differential waveform.

3. The optical detection device as claimed in claim 2, wherein the light-spot position on the light receiving element is a zero-crossing position of the differential waveform of the light-spot shape on the light receiving element, and at least one of the x-coordinate and the y-coordinate of the object to be measured is detected from the zero-crossing position of the differential waveform.

4. The optical detection device as claimed in claim 1, wherein the light-spot position on the light receiving element is a barycentric position of a light spot on the light receiving element, and at least one of the x-coordinate and the y-coordinate of the object to be measured is detected from the barycentric position of the light spot.

5. The optical detection device as claimed in claim 1, wherein the light receiving element is an area sensor in which a plurality of pixels are arrayed in lines and rows in a grating form, and the lines of the plurality of pixels arrayed in the area sensor are parallel to the x-axis and the rows of the plurality of pixels arrayed in the area sensor are parallel to the y-axis, and wherein the signal processing section:

performs, for each of the rows parallel to the x-axis, at least one of a differential waveform computation for computing a differential waveform of a light-spot shape on pixels of the row, to detect an x-coordinate of the object to be measured from positive and negative peak intensities of the differential waveform and a barycentric position computation for detecting an x-coordinate of the object to be measured from a barycentric position of a light spot on the pixels of the line, and performs, for each of the rows parallel to the y-axis, at least one of a differential waveform computation for computing a differential waveform of a light-spot shape on pixels of the row to detect a y-coordinate of the object to be measured from positive and negative peak intensities of the differential waveform and a barycentric position computation for detecting a y-coordinate of the object to be measured from a barycentric position of a light spot on the pixels of the line.

6. The optical detection device as claimed in claim 1, wherein the signal processing section detects a z-coordinate in the z-axis direction of the object to be measured from the light-spot position on the light receiving element by using a triangulation method.

7. The optical detection device as claimed in claim 6, wherein the signal processing section detects the z-coordinate in the z-axis direction of the object to be measured when the object to be measured is irradiated with the entire bundle of emission rays emitted from the light emitting element or when the positive and negative peak intensities of the light-spot shape on the light receiving element are roughly equal to each other.

8. The optical detection device as claimed in claim 1, wherein the signal processing section detects one of a moving direction and a moving speed of the object to be measured based on a difference in at least one of the x-coordinate and the y-coordinate of the object to be measured on the x-y coordinate plane between start and end of a specified time duration.

\* \* \* \* \*